US011394809B2

(12) United States Patent
Assadipour et al.

(10) Patent No.: US 11,394,809 B2
(45) Date of Patent: *Jul. 19, 2022

(54) SYSTEM AND METHOD FOR CONTINUOUS TRACKING OF MEDIA PLAYBACK USING BLOCKCHAIN

(71) Applicant: Beatdapp Software, Inc., Vancouver (CA)

(72) Inventors: Pouria Assadipour, Burnaby (CA); Andrew Batey, Vancouver (CA); Morgan Hayduk, Vancouver (CA)

(73) Assignee: Beatdapp Software Inc., Vancouver (CA)

( * ) Notice: Subject to any disclaimer, the term of this patent is extended or adjusted under 35 U.S.C. 154(b) by 39 days.

This patent is subject to a terminal disclaimer.

(21) Appl. No.: 16/911,297

(22) Filed: Jun. 24, 2020

(65) Prior Publication Data
US 2020/0412819 A1 Dec. 31, 2020

Related U.S. Application Data

(63) Continuation-in-part of application No. 16/586,876, filed on Sep. 27, 2019, now Pat. No. 10,972,560, and
(Continued)

(51) Int. Cl.
*H04L 29/08* (2006.01)
*H04L 29/06* (2006.01)
(Continued)

(52) U.S. Cl.
CPC .......... *H04L 67/535* (2022.05); *H04L 65/612* (2022.05); *H04L 67/1097* (2013.01)

(58) Field of Classification Search
CPC ..... H04L 43/00; H04L 63/12; H04L 65/4084; H04L 67/22; H04L 67/104;
(Continued)

(56) References Cited

U.S. PATENT DOCUMENTS 5,892,915 A 4/1999 Duso et al.
10,121,025 B1 * 11/2018 Rice ........................ G06F 21/10
(Continued)

FOREIGN PATENT DOCUMENTS

WO   WO-2020037139 A1 * 2/2020 ......... G06Q 30/0283

OTHER PUBLICATIONS

U.S. Appl. No. 16/557,941, Examiner Interview Summary Record (Ptol-413), dated Aug. 3, 2020, 2 pgs.
(Continued)

*Primary Examiner* — Kostas J Katsikis
(74) *Attorney, Agent, or Firm* — Kwan & Olynick LLP

(57) ABSTRACT

Systems and methods for continuous tracking of media file playback. First, transaction data from a platform stream is received. The transaction data corresponds to a request to play a media file from an end user, as well as continuous play information. Next, the transaction data is verified. Then, the verified transaction data is signed using a cryptographic signature. Next, it is determined whether the transaction data corresponds to a valid blockchain transaction. If the transaction data corresponds to a valid blockchain transaction, the valid blockchain transaction is recorded to a blockchain. Last, the transaction data and the cryptographic signature are transmitted to one or more validation nodes.

20 Claims, 24 Drawing Sheets

Related U.S. Application Data a continuation-in-part of application No. 16/557,941, filed on Aug. 30, 2019, now Pat. No. 11,095,457, and a continuation of application No. 16/457,663, filed on Jun. 28, 2019, now Pat. No. 10,469,605.

(51) Int. Cl.
*H04L 67/50* (2022.01)
*H04L 67/1097* (2022.01)
*H04L 65/612* (2022.01)

(58) Field of Classification Search
CPC ... H04L 67/1097; H04L 67/2842; H04L 9/32; H04L 9/3239; H04L 9/3247; H04L 9/3297; H04L 2209/38; H04L 2209/56; H04N 21/472; G06F 11/34
See application file for complete search history.

(56) References Cited

U.S. PATENT DOCUMENTS

| | | | | |
|---|---|---|---|---|
| 10,600,009 | B1* | 3/2020 | Augustine | G06F 16/1837 |
| 2003/0018931 | A1* | 1/2003 | Ueda | G11B 20/1803 |
| 2013/0326569 | A1* | 12/2013 | Kuo | H04N 21/6125 |
| | | | | 725/93 |
| 2017/0206523 | A1* | 7/2017 | Goeringer | G06F 21/45 |
| 2018/0039942 | A1 | 2/2018 | Rogers et al. | |
| 2019/0188712 | A1 | 6/2019 | Fedorov et al. | |
| 2019/0199516 | A1 | 6/2019 | Carver et al. | |
| 2019/0245917 | A1* | 8/2019 | Mendiola | H04L 63/166 |
| 2019/0318377 | A1* | 10/2019 | Sundaram | G06Q 20/06 |
| 2019/0340605 | A1 | 11/2019 | Lewis et al. | |
| 2020/0052917 | A1* | 2/2020 | Corral | H04L 65/4084 |
| 2020/0137440 | A1* | 4/2020 | Zavesky | H04N 21/25875 |

OTHER PUBLICATIONS

U.S. Appl. No. 16/557,941, Non-Final Rejection, dated Aug. 17, 2020, 14 pgs.
U.S. Appl. No. 16/586,876, Non-Final Rejection, dated Jul. 23, 2020, 7 pgs.
U.S. Appl. No. 16/698,912, Non-Final Rejection, dated Feb. 21, 2020, 8 pgs.
U.S. Appl. No. 16/698,912, Notice of Allowance and Fees Due (Ptol-85), dated Mar. 23, 2020, 7 pgs.
U.S. Appl. No. 16/917,612, Notice of Allowance and Fees Due (Ptol-85), dated Sep. 22, 2020, 7 pgs.

* cited by examiner

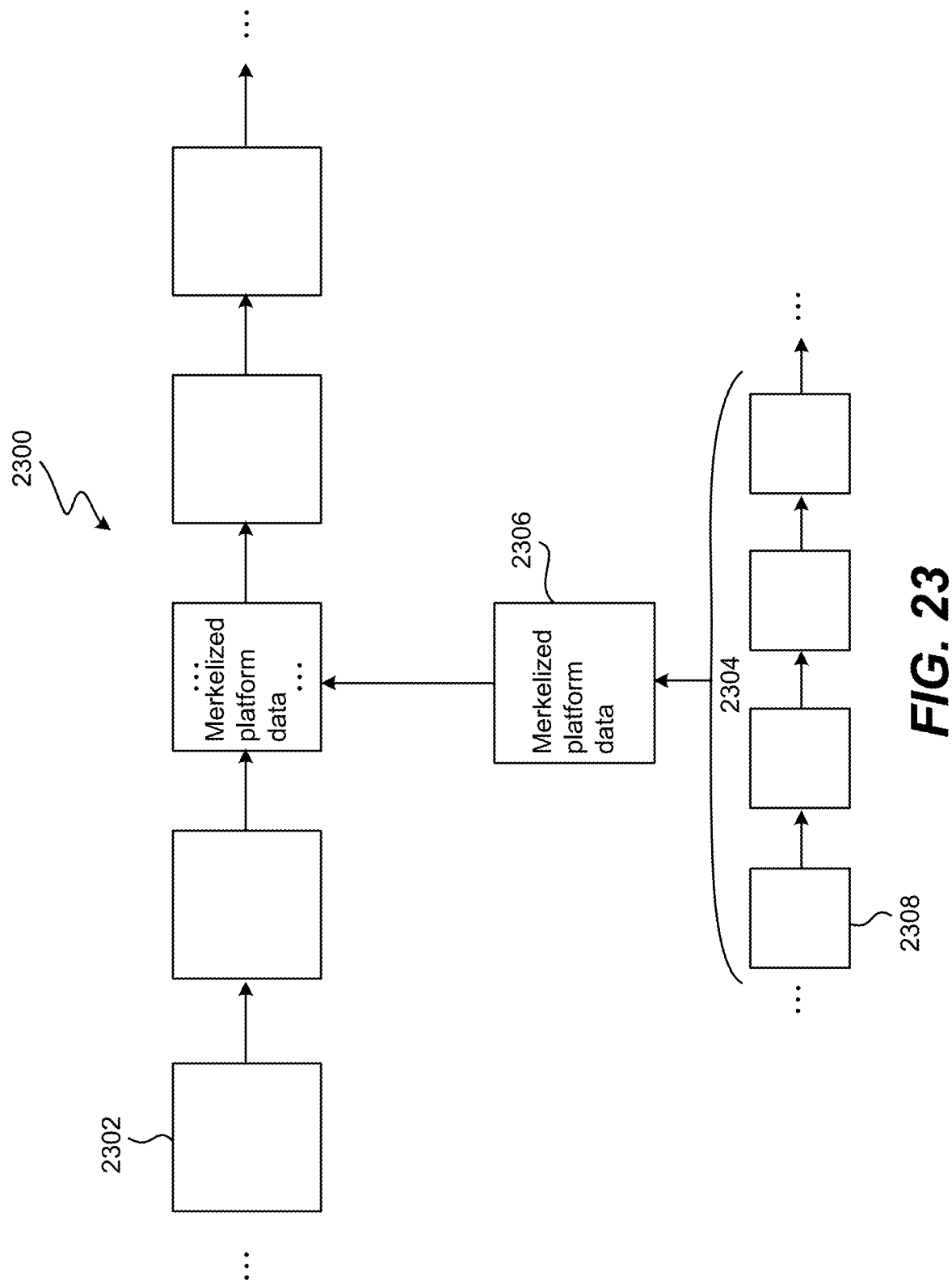

SYSTEM AND METHOD FOR CONTINUOUS TRACKING OF MEDIA PLAYBACK USING BLOCKCHAIN

CROSS-REFERENCE TO RELATED APPLICATIONS

This application is a continuation-in-part of U.S. patent application Ser. No. 16/586,876 by Batey et al., filed on Sep. 27, 2019 titled SYSTEM AND METHOD FOR SCALABLY TRACKING MEDIA PLAYBACK USING BLOCKCHAIN, which is a continuation of U.S. patent application Ser. No. 16/457,663, by Batey, et al., filed on Jun. 28, 2019, titled SYSTEM AND METHOD FOR SCALABLY TRACKING MEDIA PLAYBACK USING BLOCKCHAIN, now issued as U.S. Pat. No. 10,469,605; and a continuation-in-part of U.S. patent application Ser. No. 16/557,941 by Batey et al., filed on Aug. 30, 2019 titled SYSTEM AND METHOD FOR SCALABLY TRACKING MEDIA PLAYBACK USING BLOCKCHAIN. The above referenced applications are incorporated by reference herein in their entirety and for all purposes.

TECHNICAL FIELD

The present disclosure relates to digital media, and specifically to tracking streaming media.

BACKGROUND

The music industry generates an estimated $25 billion in revenue based on royalties. With the advent of the Internet, streaming technology makes it easy for listeners to listen to almost any song of their choosing. Artists usually work with music labels to distribute media and to help collect revenue based on royalties. These music labels distribute media through a variety of different mediums, including streaming platforms or digital service providers (DSPs), such as Spotify or Apple.

Although access to songs has been facilitated by DSPs, keeping track of all songs streamed or the amount of playback of certain songs has become an increasingly difficult problem to solve. Thus, as much as 25% of the activity on streaming platforms today is unlicensed. In addition, even for the licensed activity, up to 15% of total royalties remain uncollected annually. The DSPs claim that they lack the necessary data and technology to help figure out whose claims were legitimate, or even how to locate certain parties. In addition, the lack of an authoritative database that covers all existing music rights only adds to the problem. Further, the problem is not limited to just music, but to streaming media of all different types, such as videos, podcasts, live broadcasts, etc. Thus, there is a need for a reliable content identification technology that allows anyone to register, identify, and track creative works on the Internet.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a system and method for tracking media file playback using blockchain. In one aspect, a system is provided. The system includes a processor and memory. The memory includes instructions for executing a method. The method begins by first receiving transaction data from a platform stream. The transaction data corresponds to a request to play a media file from an end user. Next, the transaction data is verified. Then, the verified transaction data is signed using a cryptographic signature. Next, it is determined whether the transaction data corresponds to a valid blockchain transaction. If the transaction data corresponds to a valid blockchain transaction, the valid blockchain transaction is recorded to a blockchain. Last, the transaction data and the cryptographic signature are transmitted to one or more validation nodes.

In another aspect of the present disclosure, a system is provided. The system includes a processor and memory. The memory includes instructions for executing a method. The method begins by first receiving transaction data from a platform stream. The transaction data corresponds to a request to play a media file from an end user to a first validation node. Next, the transaction data is verified. Then, the verified transaction data is signed yielding a cryptographic signature, thereby validating the transaction as a valid blockchain transaction. Next, the valid blockchain transaction is recorded to a blockchain. Last, the transaction data and the cryptographic signature are transmitted to one or more validation nodes.

In yet another aspect of the present disclosure, a method for tracking play of media files via a blockchain based platform is provided. The method begins by first receiving transaction data from a platform stream. The transaction data corresponds to a request to play a media file from an end user. Next, the transaction data is verified. Then, the verified transaction data is signed using a cryptographic signature. Next, it is determined whether the transaction data corresponds to a valid blockchain transaction. If the transaction data corresponds to a valid blockchain transaction, the valid blockchain transaction is recorded to a blockchain. Last, the transaction data and the cryptographic signature are transmitted to one or more validation nodes.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIG. 23 shows an example of merklizing of a portion of a platform data set, in accordance with embodiments of the present disclosure.

DETAILED DESCRIPTION

Figure 1:
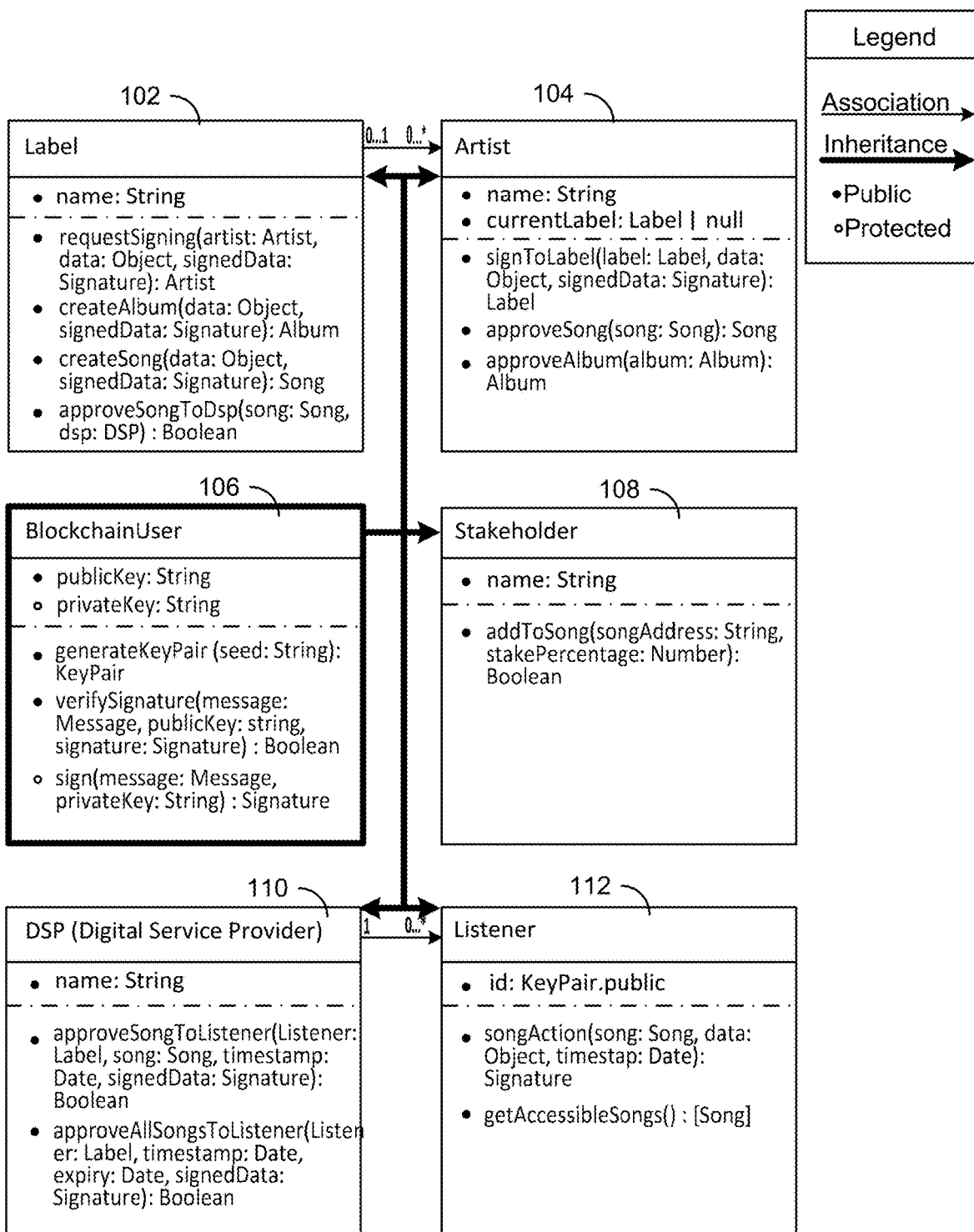
FIG. 1 shows an example diagram of available user types' relationships, data, and functions in disclosed systems, in accordance with embodiments of the present disclosure.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of tracking request and play of media files, media file transmissions, cryptography, data storage, and media access validation. However, it should be noted that the techniques of the present disclosure apply to a wide variety of network transactions, collaborative environments, data structures, and different types of data. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As used herein, the term "platform" will refer to the platform systems and methods disclosed herein. Throughout the disclosure, the terms "platform" and "system" are used interchangeably. According to various embodiments, a blockchain music platform is provided. In some embodiments, a blockchain is defined as a decentralized, secure, and unalterable digital ledger or database that keeps a permanent record of all transactions. In some embodiments, on a blockchain ledger are "smart contracts," which lay out the terms and costs of blockchain transactions. In some embodiments, the smart contracts can be amended, but all previous versions remain on the blockchain. Because of the complete history of transactions and changes to smart contracts, blockchain technology is inherently more transparent and secure than current systems of closed contracts and databases.

As used herein, the terms "sealers" and "validation nodes" will be used interchangeably and refer to any number of registered or trusted nodes used for validating transactions before adding the transactions to a blockchain. Examples of validation nodes can be DSPs, the platform, labels, and distributors.

In some embodiments, the blockchain music platform allows users to upload media files, e.g., songs, along with metadata associated with the media files, to the server or database. In some embodiments, once a request to upload a song is received, a blockchain transaction is created for the song and saved to the blockchain. In some embodiments, data such as song details, content access details, and stakeholders' stakes, as well as hundreds of other potential metadata fields, are also saved to the blockchain. In some embodiments, to ensure that data is immutable and the network is secure, transactions on the blockchain need to be validated before being finalized. In some embodiments, validation occurs only after at least 2 or more transaction validators (sealers), or authorized/trusted validation nodes, can validate the transactions.

In some embodiments, the blockchain music platform allows users to metadata associated with the media files, to the server or database. In some embodiments, once a request to upload a song's data is received, a blockchain transaction is created for the song and saved to the blockchain. In some embodiments, data such as song details, content access details, and stakeholders' stakes, as well as hundreds of other potential metadata fields, are also saved to the blockchain. In some embodiments, to ensure that data is immutable and the network is secure, transactions on the blockchain need to be validated before being finalized. In some embodiments, validation occurs only after at least 2 or more transaction validators (sealers), or authorized/trusted validation nodes, can validate the transactions. In some embodiments, it only takes one signature by a validator to consider a transaction valid.

In some embodiments, because the data storage needs are great in order to practically support media streaming for a large plurality of users, the system will not use token. However, in other embodiments, tokens can be created and used for payment processing.

In some embodiments, transactions are validated using a Proof of Authority (PoA) consensus algorithm. In other embodiments, transactions are validated using a Proof of Work (PoW) algorithm. However, according to various embodiments, PoA works better for the systems and methods disclosed for the following reasons. First, in PoA, only certain parties are allowed to validate transactions on the blockchain. Since the nodes that are allowed to seal blocks or validate transactions and identify which party they belong to are predefined, then the time needed for validation can be decreased. Second, transactions in PoA can be finalized as soon as they are processed by the blockchain, since any authorized sealer can cryptographically validate transactions. Consequently, blocks can be appended to the blockchain in any order as long as they are valid. Thus, another consequence of the PoA is that "uncle blocks" or "orphan blocks" are eliminated, since valid blocks do not get rejected simply due to the mechanism of the blockchain. Third, transaction throughput for PoA implementations are only limited by the hardware they run on. Thus, the systems disclosed can accommodate for millions of transactions per second. By contrast, for PoW implementations, the transaction throughput is mostly limited by the difficulty of the required proof of work in the protocol. Last, PoA is not susceptible to Sybil attacks since the identities of the nodes are known.

In some embodiments, the PoA consensus algorithm uses the following formula to decide which nodes are allowed to seal the next block:

$$(\text{Number of consecutive blocks minded per sealer}) = (\text{floor}(\text{Number of Sealers}/2)+1)$$

In other embodiments, the transaction will be validated and sealed by the first two available sealers in order to ensure prompt availability of content. In some embodiments, block proposals will not be used. In such embodiments, once a song or media file is requested by a client device, a short buffer of the song or media file is instantly transmitted or streamed. However, the full song or media file will not be piped to the client device until the transaction is finalized on the blockchain, usually within less than a second later. In some embodiments, the playback of a media file is not accounted for until a predetermined amount of the content has been played by the end user. Thus, in cases where an end-user does not consume the content for the predetermined length of time, the initialization of the play may have occurred and some content may be streamed to the end-user, however since they did not consume the content for long enough, the play event will not be sent to the blockchain.

According to various embodiments, billions of transactions can be made to the blockchain every hour. Consequently, a large amount of data may be stored on the blockchain. Thus, it may become impractical to control storage costs if every node needed to have a full history of the blockchain. Thus, in some embodiments, various different compatible versions of the blockchain client are created. In such embodiments, "lighter" clients will have the same functionality as the regular blockchain client. However, these clients do not need to contain all of the past blockchain history in order to do certain tasks such as validating transactions. Thus, in some embodiments, light clients do not need to download a portion of the blockchain history. In some embodiments, sealers only need download the latest block's header that was sealed in order to start validating transactions. In some embodiments, sealers are only tasked with validating cryptographic signatures and do not need any history of the blockchain's events. For "heavier" clients, data on the blockchain are pruned by using block headers as references. In some embodiments, lighter clients can use a Merkle Tree to hash data and store the root to reduce the required storage space. However, in some embodiments, parties have the option of running full nodes to have copies of the entire blockchain. In some embodiments, parties can choose whether to keep blockchain data directly on the node or to offload the data into a separate storage solution.

According to various embodiments, different parties involved with the platform will need different digital infrastructures. For example, DSPs and Music Labels may want to participate in securing the network using the platform's consensus protocol. However, different parties are free to make their own blockchain clients as long as they follow the platform's consensus protocol specifications.

In some embodiments, a node can be run by a single computer. In some embodiments, a node can be run across an array of computers. Some architecture choices for running a node can include using load balancers, scaling groups, and/or serverless technologies. The main requirement for each node is that it needs to represent one identity, perhaps by being represented by one or many public keys registered against the participant's identity.

In some embodiments, servers of the platform provide more services than just being a participant in the network. In some embodiments, the servers are responsible for serving digital media content directly to listeners via a content delivery network (CDN). In such embodiments, the platform will use the anycast methodology with nginx for a distributed set of content servers. In such embodiments, each time a file is served, it is also fingerprinted with the transaction hash or other identifying information. In other embodiments, servers of the platform provide the protocol and tracking services, but do not deliver the content directly.

In some embodiments, DSPs will be required to change their client side applications. For example, DSPs likely have a separate endpoint for each song on their platform. Thus, in some embodiments, DSPs will need to change the endpoints currently serving the file to one that will make a request to the blockchain network. Once the request is validated, the full song file will be piped to the user by the CDN.

In some embodiments, in order to cryptographically verify that a user has made a certain action, the blockchain protocol leverages asymmetric cryptography, such as elliptical curve digital signature algorithms (ECDSA). In such embodiments, end-users need to create a signature every time a request is sent. Thus, DSPs must supply their listeners (either on the client's device or using the DSP's own server) with a cryptographic keypair.

According to various embodiments, due to the large amount of transactions per second handled by DSPs, several methods for scaling are provided. In some embodiments, a consortium blockchain is implemented instead of a public blockchain. When building the consortium blockchain, PoA is used. By staking their identity/reputation, transaction validators are able to quickly approve requests and are only constrained by their own hardware and internet infrastructure.

In some embodiments, it is not feasible to use a single blockchain to record transactions occurring across the network. In some embodiments, the blockchain can be partitioned into geographic shards. For example, one shard could be responsible for North America while another is responsible for London. In some embodiments, including other embodiments noted in the present disclosure, the blockchain can be partitioned by Label and DSP relationship. For example, a shard can be between StreamCo and Label A while StreamCo has another shard with Label B. In such embodiments of relationship sharding, the participants cannot access data from a relationship that they do not belong to.

In some embodiments, each participant in the blockchain network is required to run a minimum number of nodes spread across the globe. Thus, the platform's bootnodes will geographically group sealers using a routing algorithm. In some embodiments, once a shard is spawned from the main chain, it is periodically merklized and the root hash is taken and stored on the main chain. Periodically, or once the shard is closed, the history of it is added to the main chain. In some embodiments, in the unlikely case of a dispute in a shard, the most recent cryptographically provable data will be used as the truth. In some embodiments, end users are assigned and unassigned from geographic shards by requests made on the main or DSP-Label relationship shards. In some embodiments, once a user is assigned to a certain shard, they cannot make requests in another shard within the same DSP-Label relationship shard.

In some embodiments, off-chain scaling can be incorporated into the protocol. For example, state channels, child chains, or sharding chains can all be used in the consensus protocol. The following example illustrates one method for incorporating off-chain scaling. In the example, the platform's sharding implementation uses a main chain transaction to open a relationship. As a note, every media play is counted instead of just the final outcome of the state channel.

CDN Example: Alice opens up her music application to play music from a DSP. She is assigned to the appropriate geographic shards for her DSP (either existing or newly created if resources are available). Alice can now stream any amount of media content without stressing the main chain. Each stream request is signed by Alice using her private key and can be verified by any sealing node by using her public key.

Looking at the following use case of her music application one of ordinary skill in the art can see how sharding improves performance: Alice requests to play a song by cryptographically signing a request. The request is verified by at least two sealers before the platform CDN streams music to Alice. The call to the song's address will be recorded to the shard's blockchain. The difference between this method and a conventional call to the blockchain is that the requests won't be committed to the main chain right away. At arbitrary intervals in the song's runtime, a request is automatically made from the client within the shard to get the next part of the song the user is listening to. Data will be piped in chunks to keep track of playback data. If at any point there's a transaction that wasn't signed by Alice or there's a dispute on the number of songs that she played, the most recent cryptographically provable data is committed to the main chain. Then the shard continues or closes and the main chain reassigns all the active users in the shard. If Alice hasn't listened to any music for an arbitrarily set amount of time (as defined when she joined the shard), then she is unassigned from all shards.

In some embodiments, every song streamed from one of the platform's CDNs will be stamped allowing the original streamer of the content to be identified. In some embodiments, the entire fingerprinting process is broken up into two main components: stamping (applying the fingerprint to the track) and scraping (finding tracks that were originally played from the platform's CDNs and identifying how the content leaked). In some embodiments, the fingerprinting method must remain secret in order to ensure bad actors don't try to remove or distort their identifying fingerprint.

Although the example above with regard to Alice involves CDN architecture, the protocol with blockchain recordation of play requests and counts pertaining to the same also apply to non-CDN architecture. Transaction requests can be validated and recorded in an analogous manner to the above example except that the delivery of content is provided by DSPs and not directly through the platform (third party play count record keeper and auditor) implementing the protocol. In a non-CDN system, once a transaction is seen by a validator (or sealer), the data within the transaction can be checked for cryptographic validity by verifying the transaction data against the end user's public key. Once this validation step passes, the transaction data is signed by the validator and the resulting signature is written back to the platform along with the associated transaction ID. Signatures are aggregated by transaction and stored in a long term storage solution. All validators are able to read directly from the stream. As a result, validators within the same network cluster will have the ability to capture the same set of signatures that are associated with each specific transaction by associating the data with the transaction through its transaction ID.

In some embodiments, every node/validator has an API endpoint (e.g., a URL) for the stream. In some embodiments, a stream is similar to a server, but with the difference that a transaction can sit in the stream for an arbitrary amount of time.

In some embodiments, a playback request is initially formed by an end user. The request format must follow the rules set out by the protocol. The request is then signed by the end user who created the request so the origin of the request can be verified in the future. The signed request and the accompanying data are sent to the platform's stream, again, in a format that is set by the protocol. For example, if the first receiving node of the play request was the DSP, then the DSP can subsequently send the verified and signed request to the platform and/or label. After the platform and/or label verifies and signs the request, the verified and signed request is submitted back to the DSP. Once two validators sign the request, the transaction is added to the block chain. In some embodiments, a single transaction can constitute a block in the blockchain. In other embodiments, a block can constitute many transactions.

In some embodiments, each validator has the option to store a transaction on their own copy of the blockchain at any time. In other embodiments, the validators synchronize their blockchain with other validators.

In some embodiments, child chains are spawned when a new DSP/label relationship is formed. In some embodiments, each DSP has their own branch child chain from the main chain. However, maintaining raw data on parent chains and child chains can become computationally heavy. Thus, in some embodiments, raw data stays on the child chains while the merklized root nodes of the raw data are propagated up the parent chains.

In some embodiments, now that the data exists in the stream, it can be cryptographically verified by validators on the platform. Each time a request is validated, the transaction data is then signed by the validator. The signature is written back to the stream with a reference to the ID of the request data.

Each validator can capture the signature of the other validators and keep them in their own ledger. This is done in order to demonstrate that the original transaction was validated by specific validators in the future.

Depending on the implementation of the data flow, the end user can pass the request directly to a validator instead of writing the request directly to the stream. If valid, the request is then signed by the validator. At this point, the transaction has the original request data and two signatures, one from the end user and one from the initial validator. It is then written to the stream. Now that the data exists in the stream, it can be cryptographically verified by validators on the platform. The original validator who wrote the request to the stream is able to capture new validations coming through the stream. Each time a request is validated, the transaction data is then signed by the validator. The signature is written back to the stream with a reference to the ID of the request data.

In some embodiments, an initial request is considered valid if: 1) the format of the data follows the protocol established by the platform; and 2) the data is accompanied with a cryptographic signature and the end-user public key. In some embodiments, the end user can use a different format for the request than the protocol. In such embodiments, the DSP or first receiving node can reconfigure the format to align with the platform protocol before it is submitted to the stream.

In some embodiments, on the output of the stream, the validators listen for unsigned requests and requests that may have been signed by other validators but not themselves. In order to validate the requests that are written to the stream, the validator looks for 3 main pieces of data: the actual request data, the end user's public key that created the request, and a cryptographic signature.

The request data is verified to have originated from the end user if the public key attached can be used to verify the signature against the request data. Once verified by the validator, the validator signs the request data and writes back to the stream. The data that is written back to the stream consists of a request identifier and the validator's signature, signaling that the transaction is valid.

As mentioned above, in some embodiments, instead of being written directly to the stream, the request can be passed through to a validator who will then send it either directly to another validator or to the stream itself for distribution. Now when the request enters the stream, it can have 2 or more signatures. One belonging to the end user who originally made the request and one or more belonging to the validators who have validated and signed the request. The validators who signed the request before it made its way to the stream are able to watch the stream to catch signatures on the request that were created by other validators.

In some embodiments, by stamping files using digital steganography, minimal user data can be hidden within the data that is being sent to the user. Each time a song is streamed or downloaded, a hidden "watermark" can be written to the file. Using digital signal processing, an algorithm can write or identify parts of digital content that are common to every file of that format. For example, every mp3 file will have a point in the song that is a lower pitch than all the other portions of the song. At the common point of the song, an encrypted digital fingerprint of the user can be added.

In some embodiments, stamp recognition software will extract digital fingerprints by using digital signal processing to deconvolute the original file uploaded from the file that was scraped from the web. If a digital fingerprint is found, it can be decrypted and traced back to a user and time of play. In some embodiments, scraping for fingerprinted content can be broken down into 3 major steps: 1) Build a web crawler for common pirating/streaming sites. 2) Extract and cache audio files. This step requires a custom solution for scraping for each streaming/download site. 3) Run cached audio against the stamp recognition software.

According to various embodiments, the systems and methods disclosed allow for verification of catalog, ownership, and payment details for media files. In some embodiments, the systems also allow for accruing and accounting of payments. In some embodiments, the systems also allow for depositing the correct amounts in the correct accounts. In some embodiments, the systems provide for equitable, transparent, auditable, and near-real-time payment for creators of musical works and sound recordings (artists), labels, and distribution platforms. In addition, in some embodiments, the systems provide real-time compliance and auditing mechanisms.

FIG. 1 shows an example diagram of some available user types' relationships, data, and functions in disclosed systems, in accordance with embodiments of the present disclosure. In some embodiments, based on a user's role, they will have different responsibilities on the disclosed platform. In FIG. 1, every user 106 is able to make their own cryptographic key pair for signing data and verifying signatures against given data and public keys.

In some embodiments, labels 102 are in charge of uploading songs and album metadata to the platform. In some embodiments, labels can additionally approve songs in their catalog to be distributed by DSPs. In some embodiments, label administrators prepare a song or album for the platform by filling in the required metadata, uploading the song file, and assigning stakeholder shares. Upon receiving a valid upload request from a label account, an entry is broadcasted to the blockchain. In response to an artist being credited to a song, the artist now has the option to approve the song, which will make it available to the DSP on the song's release date.

In some embodiments, the uploaded song is held on a media server and can only be accessed by users who have made a cryptographically valid request to the blockchain to access the content. In some embodiments, the administrator can use the platform web product to view analytical data about song playbacks. In some embodiments, the administrator can break down data by each request, allowing them to track how users are engaging with their content.

In some embodiments, once an artist 104 gets a contract offer with a label 102, artist 104 can accept being added to the label 102. In some embodiments, artist 104 may not be assigned to a label. In such embodiments, artist 104 is able to act as their own label on the platform. When a label 102 uploads a song, it is unconfirmed until the credited artist 104 approves the upload. Artists 104 are allowed to view their own song playback data via the platform but are restricted from viewing any of their colleagues' data.

In some embodiments, stakeholders 108 for each song are determined before getting finalized on the blockchain. In some embodiments, a percentage of revenue of each song is assigned to stakeholders 108. In some embodiments, stakeholders 108 are able to view data on songs which they own part of.

In some embodiments, thanks to DSPs 110, end-users 106 are given access to songs. Since most DSPs 110 use a subscription model there's functionality to allow a user 106 to listen to any song on the DSP's platform for a set time period. In some embodiments, the suggested changes that existing DSPs will need to make to their systems in order to leverage the platform's technology are minor.

In some embodiments, users 112 of a DSP's application should not perceive any difference when streaming songs. Instead, the DSP 110 that created the end user is in charge of managing the user's key. Whether the DSP wants to sign requests using their own servers or their client applications is up to the DSP.

Figure 2:
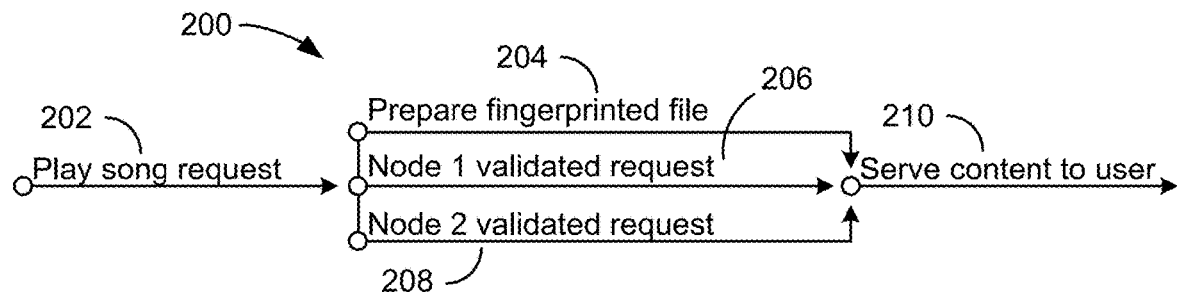
FIG. 2 illustrates an example latency analysis from a song play request to serving fingerprinted content, in accordance with embodiments of the present disclosure.

In some embodiments, latency issues arise when nodes are not sufficiently close, meaning the latency between two nodes goes up as the distance between them increases. By leveraging geographic sharding of the child chains, signal travel time will be reduced. FIG. 2 will help explore latency on the blockchain network. FIG. 2 illustrates an example latency analysis from a song play request to serving fingerprinted content, in accordance with embodiments of the present disclosure. The latency 200 can be broken down into steps, some of which run in parallel.

At 202, a song is requested for play. In some embodiments, when an end user plays a song, the request is transmitted to 2 main places: the blockchain shard assigned to the user and the CDN. At 204, the fingerprinted file is prepared. Steps 206 and 208 deal with sealing the request. In some embodiments, the first 2 out of 3 distinct parties to validate the request will signal that the transaction is sealed. At 206, the request is validated by the first node. At 208, the request is validated by the second node. Not visualised here is a third node that is slower than the other two nodes, 206 and 208, at validating the incoming play request. This slower node can still have its cryptographic signature attached to the play event eventually, however it is not required to seal this play request. At 210, content is served to the user. In some embodiments, the server pipes the digital media file to the user. As a result of the path outlined in FIG. 2, the following equation for a successful file response can be written:

$$t_{latency} = \max(t_{client \square CDN}, t_{client \square Node\ 1}, t_{client \square Node\ 2}) + \max(t_{prep\ file} + t_{Node\ 1 \square CDN}, t_{Node\ 2 \square CDN}) + t_{serve\ file}$$

In some embodiments, privacy of data is important. According to various embodiments, there are two ways for DSPs and labels to ensure that their competitors are not able to view their analytical data: 1) multi-layered sharding and 2) zero knowledge proofs.

Figure 3:
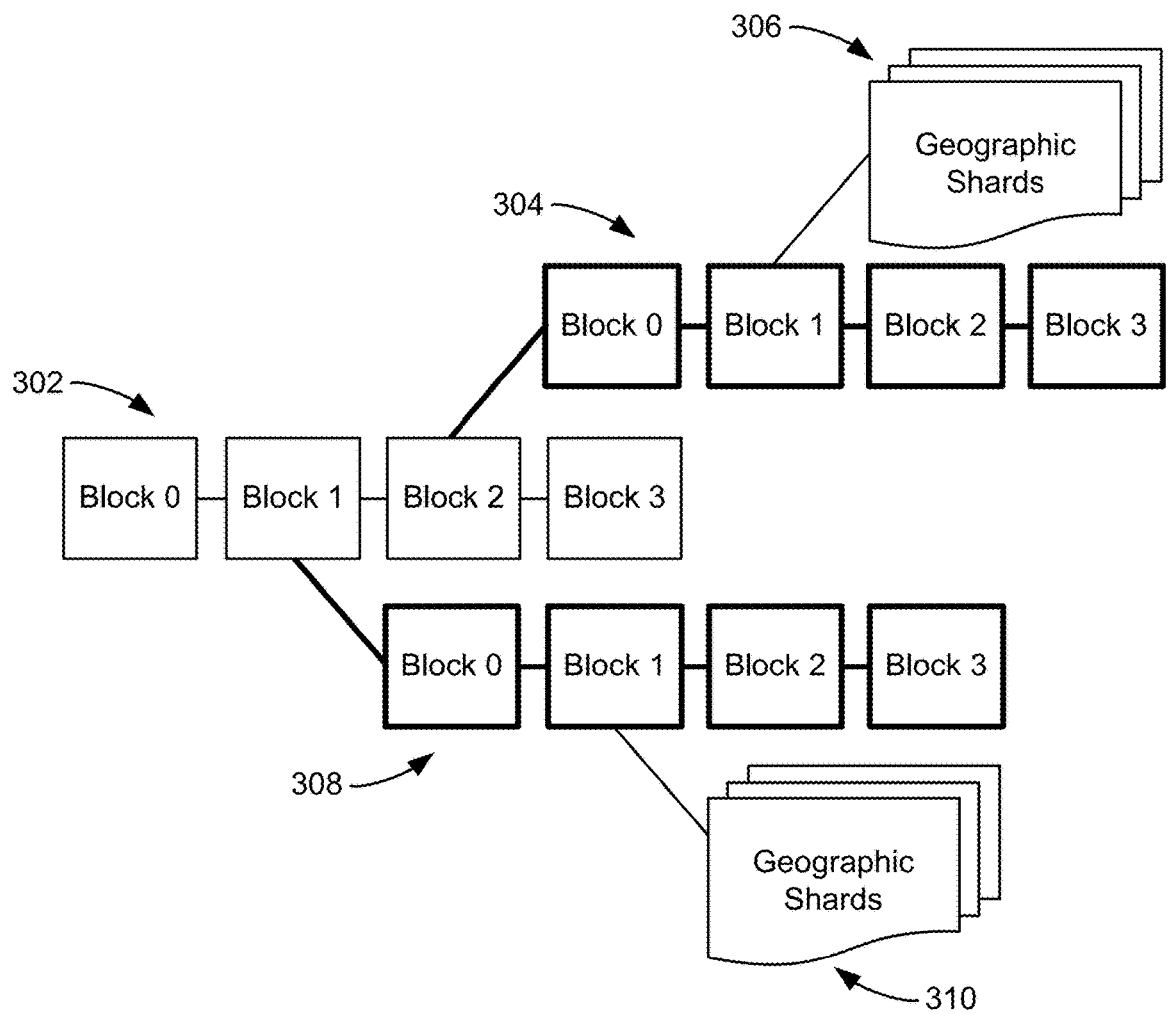
FIG. 3 illustrates an example diagram of sharding, in accordance with embodiments of the present disclosure.

FIG. 3 illustrates an example diagram of multi-layered sharding, in accordance with embodiments of the present disclosure. FIG. 3 illustrates main chain 302, relationship shards 304 and 308, as well as geographic shards 306 and 310. In some embodiments, each Label-DSP relationship is grouped into its own shard 304 or 308.

In some embodiments, zero knowledge proofs are also used to ensure data privacy. With zero knowledge proofs, network participants can cryptographically validate a transaction without revealing the data in the transaction. In some embodiments, any data written to the chain should use one-way encryption. This keeps any data on the chain as only readable by the parties who have the key to decrypt the data. In some embodiments, the decryption key on each relationship shard will be shared between the DSP and Label.

In some embodiments, while having the platform own the servers for the CDN requires the least trust between labels and DSPs, there are alternative tracking methods available. For example, the platform can create a software development kit (SDK) or library to run with the DSPs' applications. In such an example, the primary purpose of the SDK is to provide the DSP with the right cryptography algorithms used to sign and verify transactions. In some embodiments, the DSP will be required to provide a report at regular intervals or by certain triggers, with playback event data and their associated signatures. In some embodiments, the platform will arrange an auditing system where the system creates end-user accounts on the streaming platform and ensures that the plays are being counted according to the protocol. In some embodiments, the benefits of using the SDK include the fact that the DSPs will be happy they can hold onto the content. In some embodiments, the drawbacks of this method include the fact that the DSPs still control the content on their servers and that Labels can only verify figures by doing a covert audit of the DSP. In some embodiments, the platform will have to write an implementation of the plugin for each of the DSPs' interfaces (web, mobile app, desktop app).

In some embodiments, another alternative tracking method involves encrypted codecs. In such embodiments the platform can create a custom file type to encrypt a file every time it is accessed. In some embodiments, the DSPs can then hold the encrypted files on their own servers. This encryption method could take in a signed request by the user in order to decrypt the file. In some embodiments, the benefits of this method include the fact that offline interactions can be trustlessly taken into account with this method. In some embodiments, another benefit is the possibility of covertly stamping the user's data to the file in the decryption step. In some embodiments, yet another benefit includes the fact that DSPs are happy they can hold onto the content. In some embodiments, the drawbacks of this method include the fact that it requires talent to research and implement a new standard. In some embodiments, another drawback includes the fact that there is still a vector to steal the contents of the file by accessing the device's cache on which the content is being played. In some embodiments, yet another drawback is that fact that DSPs have to implement the codec standards the platform puts forward.

FIGS. 4-10 are illustrated to provide more context to the music industry and the role that the platform (and the disclosed systems and methods) plays in licensing and streaming music.

Figure 4:
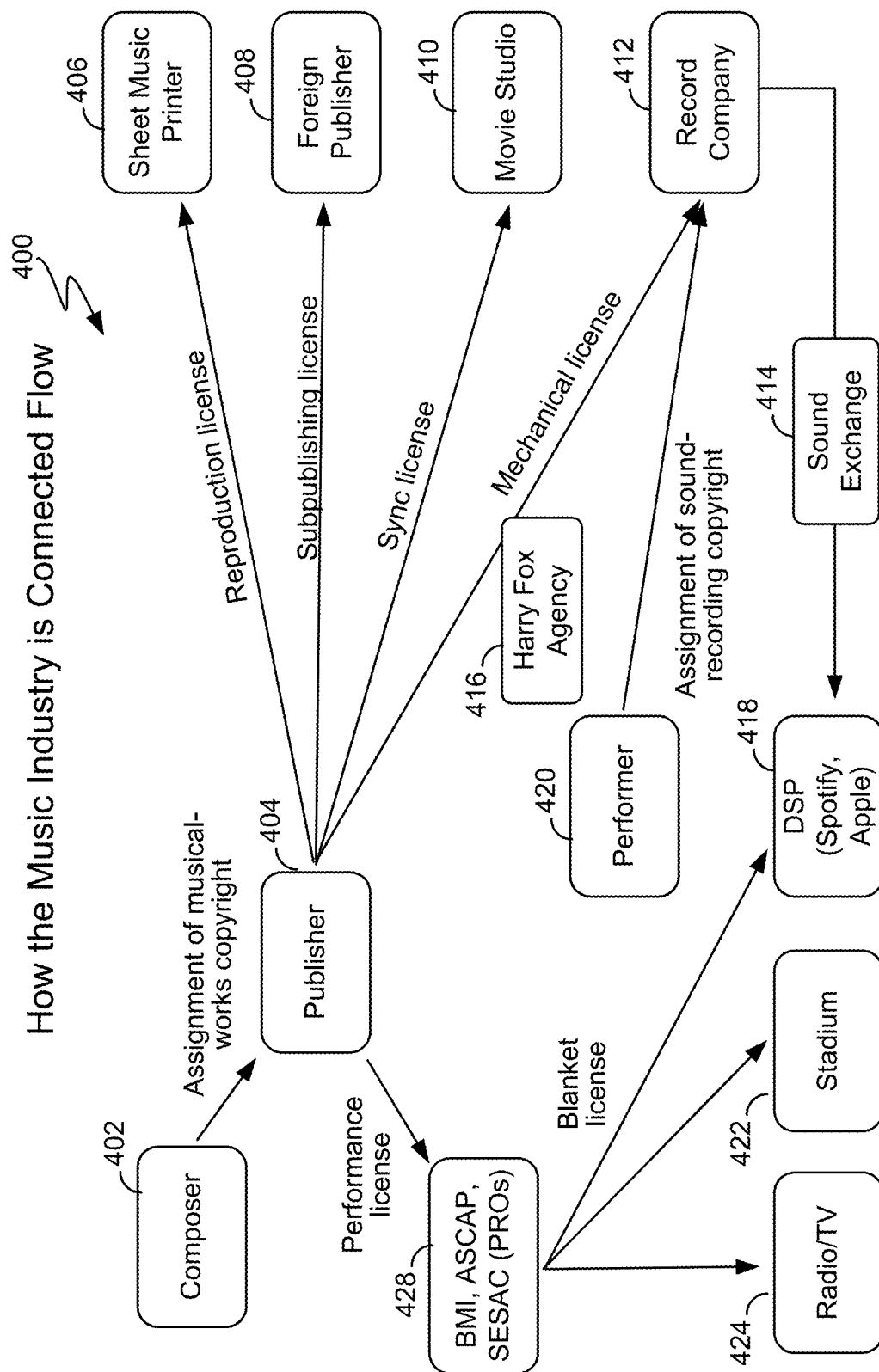
FIG. 4 shows a diagram of one example of how the music industry is connected, in accordance with embodiments of the present disclosure.

FIG. 4 shows a diagram 400 of one example of how the music industry is connected, in accordance with embodiments of the present disclosure. In FIG. 4, composers 402 assign musical works copyright to publisher 404. Next publisher 404 grants a performance license to performance rights organizations (PROs) 428. PROs 428 then issues blanket licenses to Radio/TV 424, Stadiums 422, and DSPs 418. Going back to publisher 404, publisher 404 also gives reproduction licenses to sheet music printers 406, subpublishing licenses to foreign publishers 408, sync licenses to movie studios 410, as well as mechanical licenses to record companies 412. In some embodiments, the mechanical licenses go through the Harry Fox Agency 416. Record companies 412 are also assigned sound recording copyrights from performers 420 and then subsequently provide sound exchange 414 with DSPS 418.

Figure 5:
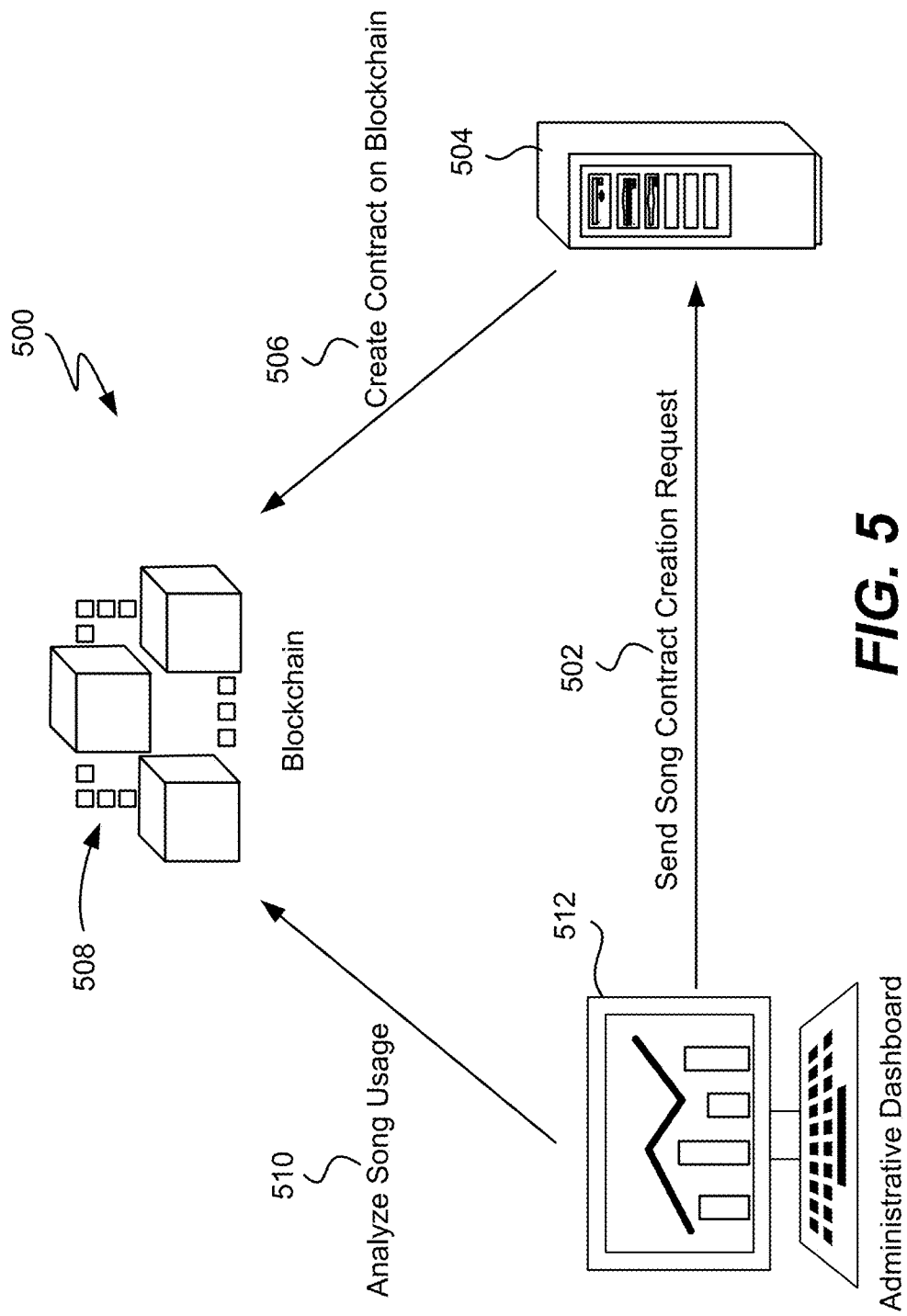
FIG. 5 shows a diagram of one example of the role of a basic administrator, in accordance with embodiments of the present disclosure.

FIG. 5 shows a diagram 500 of one example of the role of a basic administrator, in accordance with embodiments of the present disclosure. First, administrative dashboard 512 sends a song creation request 502 to server 504. Next, server 504 creates a contract 506 on blockchain 508. Last, administrative dashboard 512 analyzes song usage 510 at the blockchain.

Figure 6:
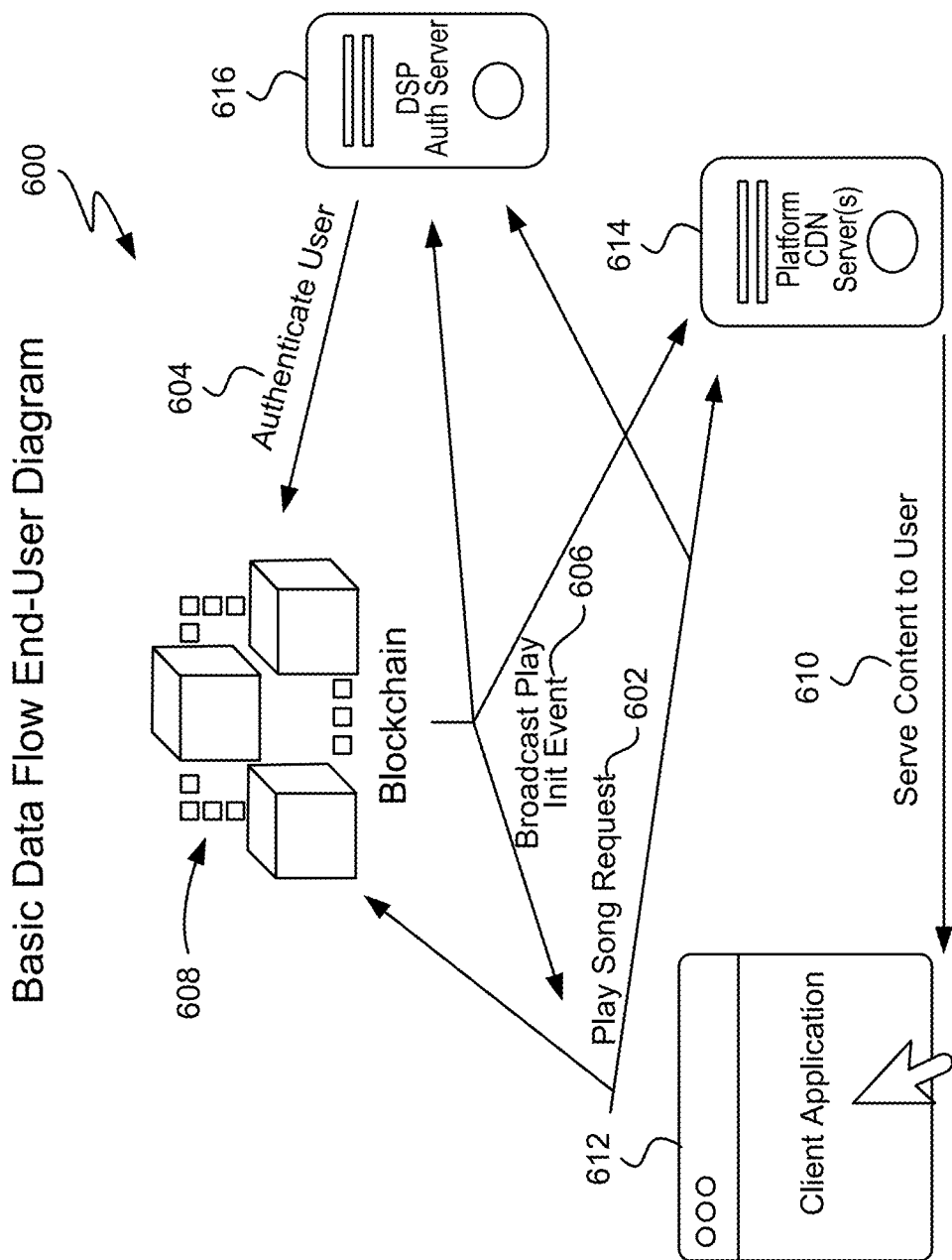
FIG. 6 shows a diagram of one example of a basic data flow of an end-user, in accordance with embodiments of the present disclosure.

FIG. 6 shows a diagram 600 of one example of a basic data flow of an end-user, in accordance with embodiments of the present disclosure. Diagram 600 begins with client application 612 sending a play song request 602 to platform CDN server 614, blockchain 608, and DSP authentication server 616. Next, DSP authentication server 616 communicates 604 to the blockchain network 608 that the user is indeed allowed to access the specified resource. Next, blockchain 608 broadcasts that the play is ready to be initialized by the CDN 614 to the client application 612. Last, platform CDN server 614 serves the content to the user 610.

Figure 7:
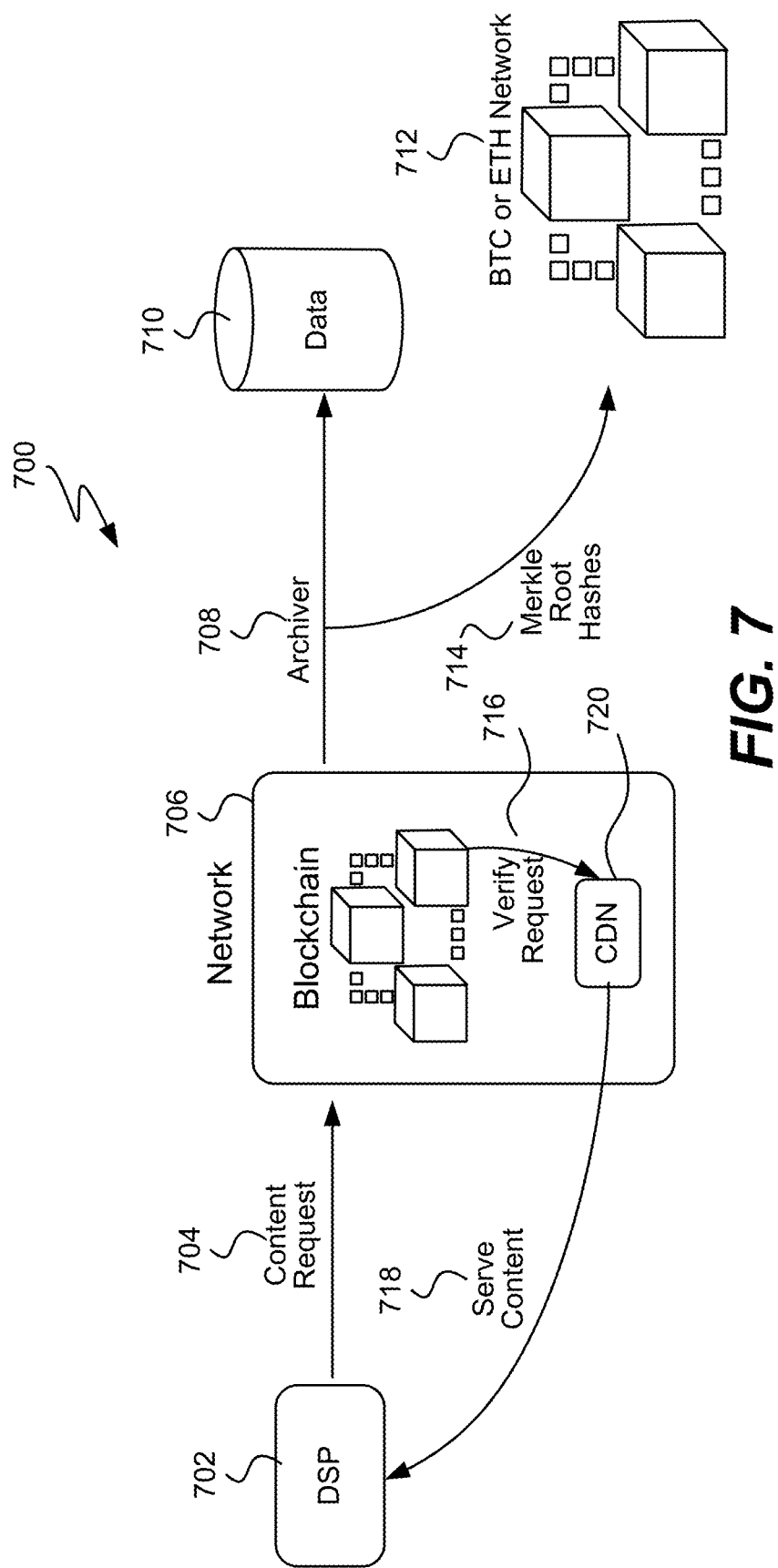
FIG. 7 shows a diagram of one example of a media file playback tracking network, in accordance with embodiments of the present disclosure.

FIG. 7 shows a diagram 700 of one example of a media file playback tracking network, in accordance with embodiments of the present disclosure. DSP 702 transmits a content request 704 to blockchain network 706. Blockchain network 706 then verifies the request 716. After the request is verified and considered sealed, CDN 720 serves content 718 to the DSP 702 or to the DSP's end-user who made the original playback request. Transactions that are validated are archived 708 for later inspection or audit into a data storage solution 710. Periodically or upon certain events, a segment of the blockchain data is distilled down to its merkle root hash 714 and that root hash is written to a third party blockchain network 712. The mechanism for writing to an external blockchain is further explored in FIG. 13.

Figure 8:
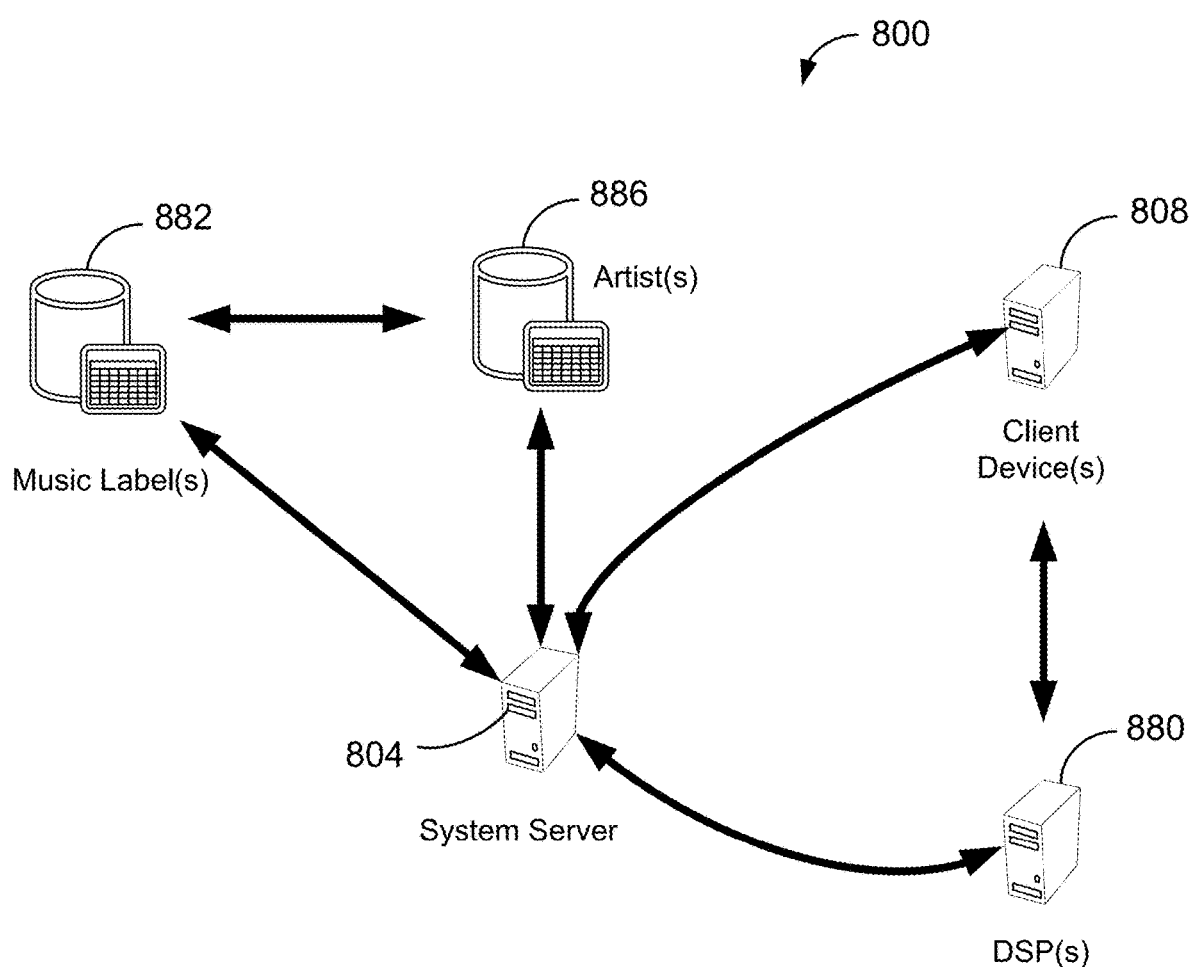
FIG. 8 shows a system diagram of an example of a system for tracking media file playback, in accordance with embodiments of the present disclosure.

FIG. 8 shows a system diagram of an example of a system 800 for exchanging information within a network environment, in accordance with some implementations. System 800 includes a variety of different hardware and/or software components which are in communication with each other. In the non-limiting example of FIG. 8, system 800 includes at least one system server 804, at least one client device 808. In some embodiments, system 800 includes at least one digital service provider (DSP) 880. One example of a DSP is Spotify or iTunes. In some embodiments, system 800 also includes a music label 882, and/or at least one artist 886. In some embodiments, music label 882 represents and uploads music from artists 886, but sometimes, artists 886 do not have a record label and thus upload music directly to system server 804. Often times, client device 808 streams songs from DSP 880. System 800 allows for system server 804 to help keep track of what songs are being streamed at client 808 via DSP 880.

System server 804 may communicate with other components of system 800. This communication may be facilitated through a combination of networks and interfaces. System server 804 may handle and process data requests and data transfers from the client device 808 (for direct content delivery models) and DSP 880. Likewise, system server 804 may return a response to client device 808 after a data request has been processed. For example, System server 804 may retrieve data from one or more databases, such as music label 882 or artist 886. It may combine some or all of the data from different databases, and send the processed data to one or more client devices or DSPs.

A client device 808 and DSP 880 may be computing devices capable of communicating via one or more data networks with a server. Examples of client device 808 and DSP 880 include a desktop computer or portable electronic device such as a smartphone, a tablet, a laptop, a wearable device, an optical head-mounted display (OHMD) device, a smart watch, a separate server, etc. Client device 808 and DSP 880 include at least one browser in which applications may be deployed.

Music label 882 can be a database implemented in a relational or non-relational database management system. In some embodiments, this database can include the contents of one or more client-related databases within a network environment.

Artist 886 can be an individual artist not associated with a record/music label, or an artist that is associated, but has special needs not fulfilled by the music label. In some embodiments, communication with artists 886 can include edits, modifications, and/or tracked changes information related to songs, albums, or any other streaming media associated with the artist.

Figure 9:
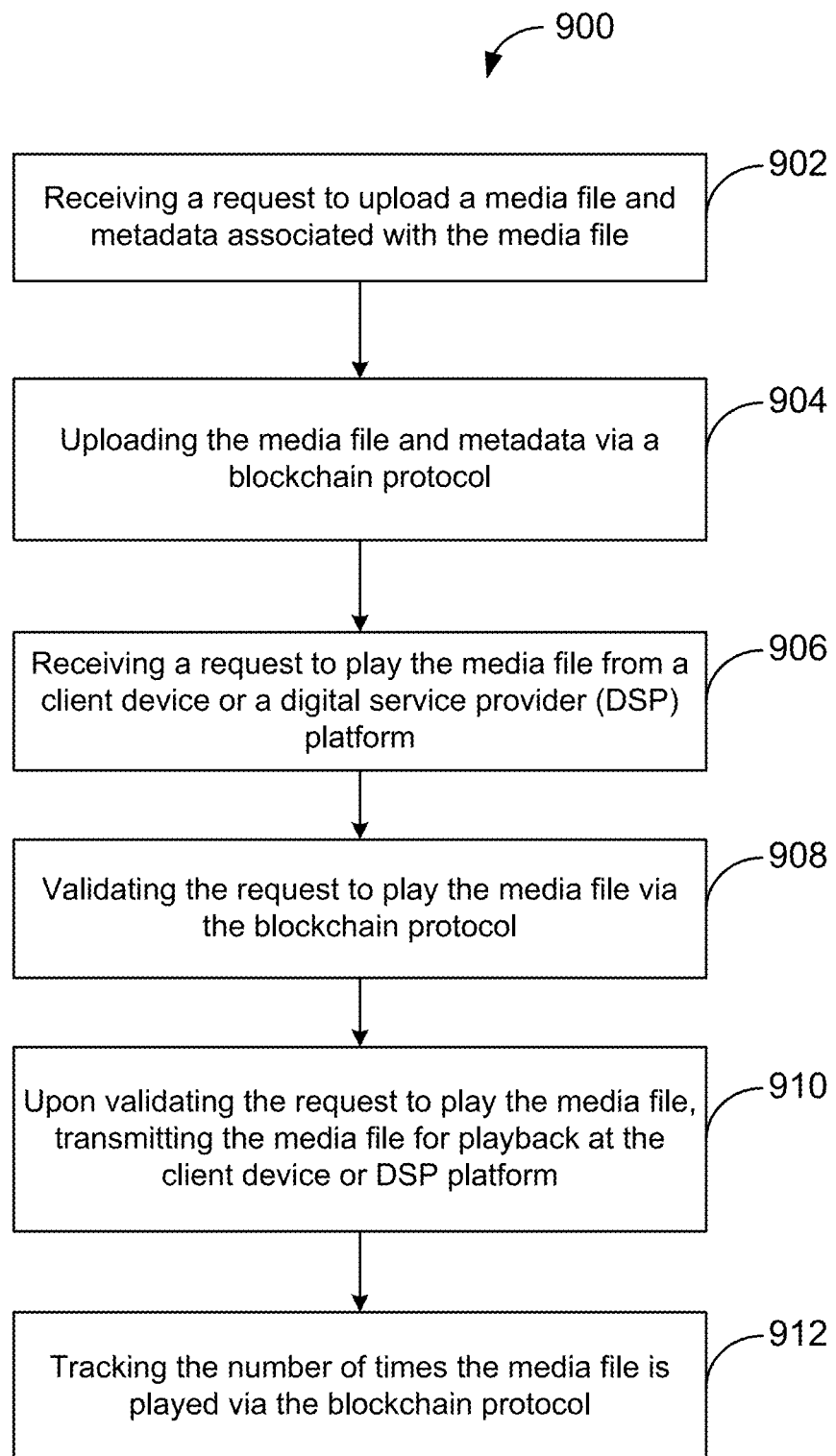
FIG. 9 shows a flowchart of a method for tracking media file playback using CDN architecture, in accordance with embodiments of the present disclosure.

FIG. 9 shows a flowchart of a method 900 for tracking media file playback using CDN architecture, in accordance with embodiments of the present disclosure. Method 900 for begins with receiving (902) a request to upload a media file and metadata associated with the media file. Next, the media file and metadata associated with the media file are uploaded (904) via a blockchain protocol. At 906, a request to play the media file from a client device or a digital service provider (DSP) platform is received. At 908, the request to play the media file is validated via the blockchain protocol. At 910, upon validating the request to play the media file, the media file is transmitted or streamed for playback at the client device or DSP platform. However, a small portion of the beginning of the media file could be streamed to the end user before the request has been validated in the interest of keeping latency low. Last, the number of times the media file is played up to a predetermined length is tracked (912) via the blockchain protocol.

In some embodiments, the blockchain protocol utilizes a proof of authority algorithm. In some embodiments, validating the request includes cryptographically validating the request by one or more authorized sealers (validation nodes) from a plurality of sealers. In some embodiments, the request to play the media file includes a request to the blockchain to access the content at a specified time. In some embodiments, requests to the blockchain can be finalized as soon as they hit the blockchain thereby allowing appending to the blockchain in any order. In some embodiments, a short buffer of the media file is instantly streamed after receiving the request to play the media file, but the rest of the media file is only streamed after the request to play has been validated. In some embodiments, different versions of the blockchain client can be used for different clients assuming they follow the platform protocol rules.

Figure 10:
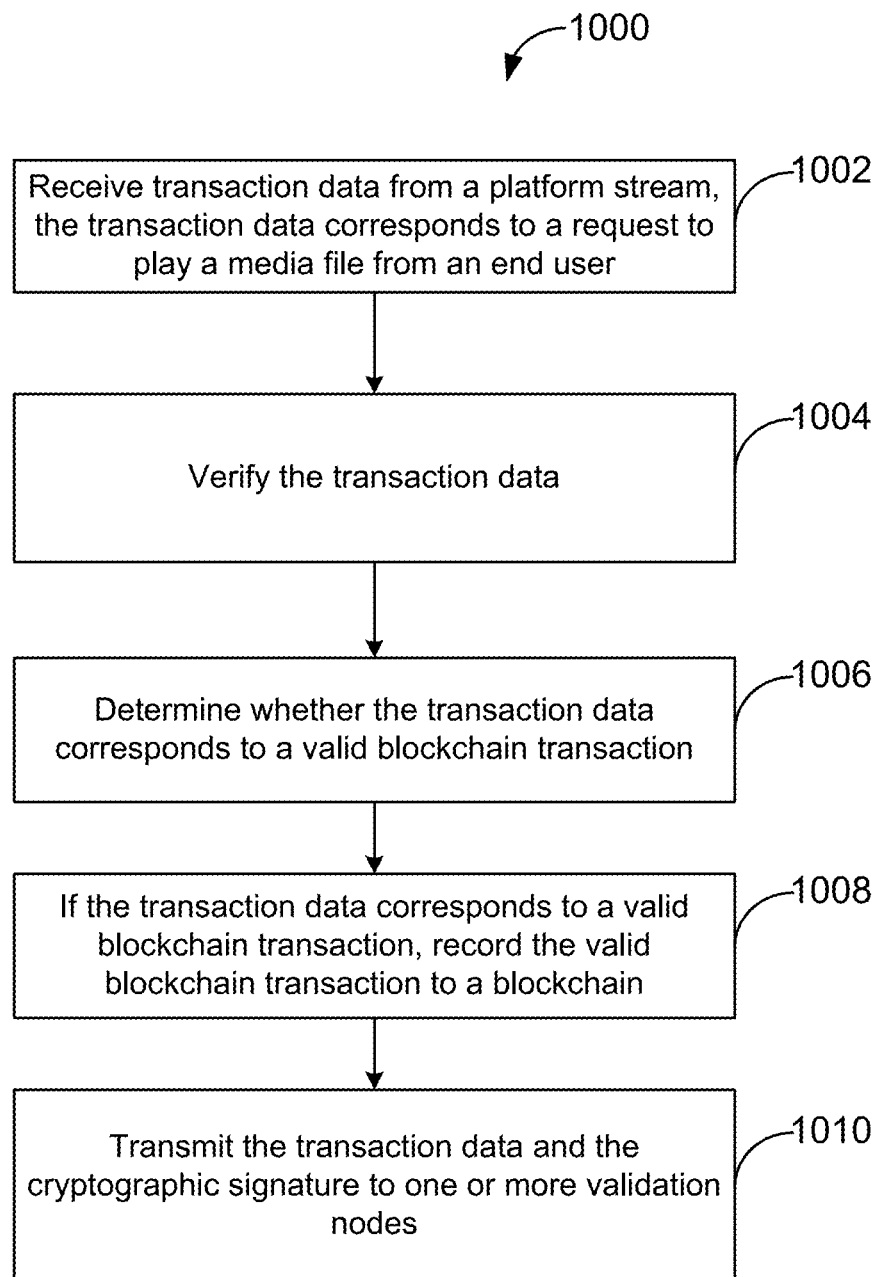
FIG. 10 shows a flowchart of a method for tracking media file playback using non-CDN architecture, in accordance with embodiments of the present disclosure.

FIG. 10 shows a flowchart of a method 1000 for tracking media file playback using non- CDN architecture, in accordance with embodiments of the present disclosure. Method 1000 begins with receiving (1002) transaction data from a platform stream. In some embodiments, a stream is a sequence of data elements made available over time. The stream serves as an ingestion point for transaction requests and then outputs the transaction requests to the relevant parties. In some embodiments, the relevant streams can be any number of registered or trusted validation nodes, e.g., DSPs, the platform, labels, or distributors. In some embodiments, validation nodes have to go through a registration process beforehand in order to become trusted. In some embodiments, an end user device creates and signs the transaction data and then transmits the data to the platform stream. The transaction data corresponds to a request to play a media file from an end user. In some embodiments, the transaction data includes a cryptographic signature corresponding to the end user. This is to verify that the initial request came from the end user.

Next, the transaction data is verified (1004). In some embodiments, verifying the transaction data includes verifying: 1) whether the format of the transaction data follows a protocol established by the platform, and 2) whether the transaction data includes a cryptographic signature of the end user that can be verified with a public key corresponding to the end user. At 1006, the verified transaction data using a cryptographic signature is signed. In some embodiments, the signor is the receiving validation node. In other words, once the transaction request is verified, the receiving validation node adds its own cryptographic signature.

At 1008, it is determined whether the transaction data corresponds to a valid blockchain transaction. In some embodiments, a blockchain transaction is considered valid if it has been signed by at least two validation nodes/sealers. If the transaction data corresponds to a valid blockchain transaction, then the valid blockchain transaction is recorded to a blockchain. In some embodiments, the signature just added by the receiving validation node in step 1006 may be the second signature needed to deem the transaction as valid. In some embodiments, the blockchain is the platform's blockchain or a copy of the platform's blockchain. In some embodiments, the blockchain utilizes a proof of work algorithm.

Last, the transaction data and the cryptographic signature are transmitted (1010) to one or more validation nodes. In some embodiments, the transaction data and cryptographic signature are resubmitted to the stream. If the receiving node is the platform, then the other validation nodes may be DSPs, labels, or distributors. If the receiving node is a DSP, then the other validation nodes may be the platform, labels, or distributors. In some embodiments, transmitting the transaction data and the new signature to other nodes propagates the verification protocol, especially if the transaction data received in step 1002 included less than two validation node signatures.

Figure 11:
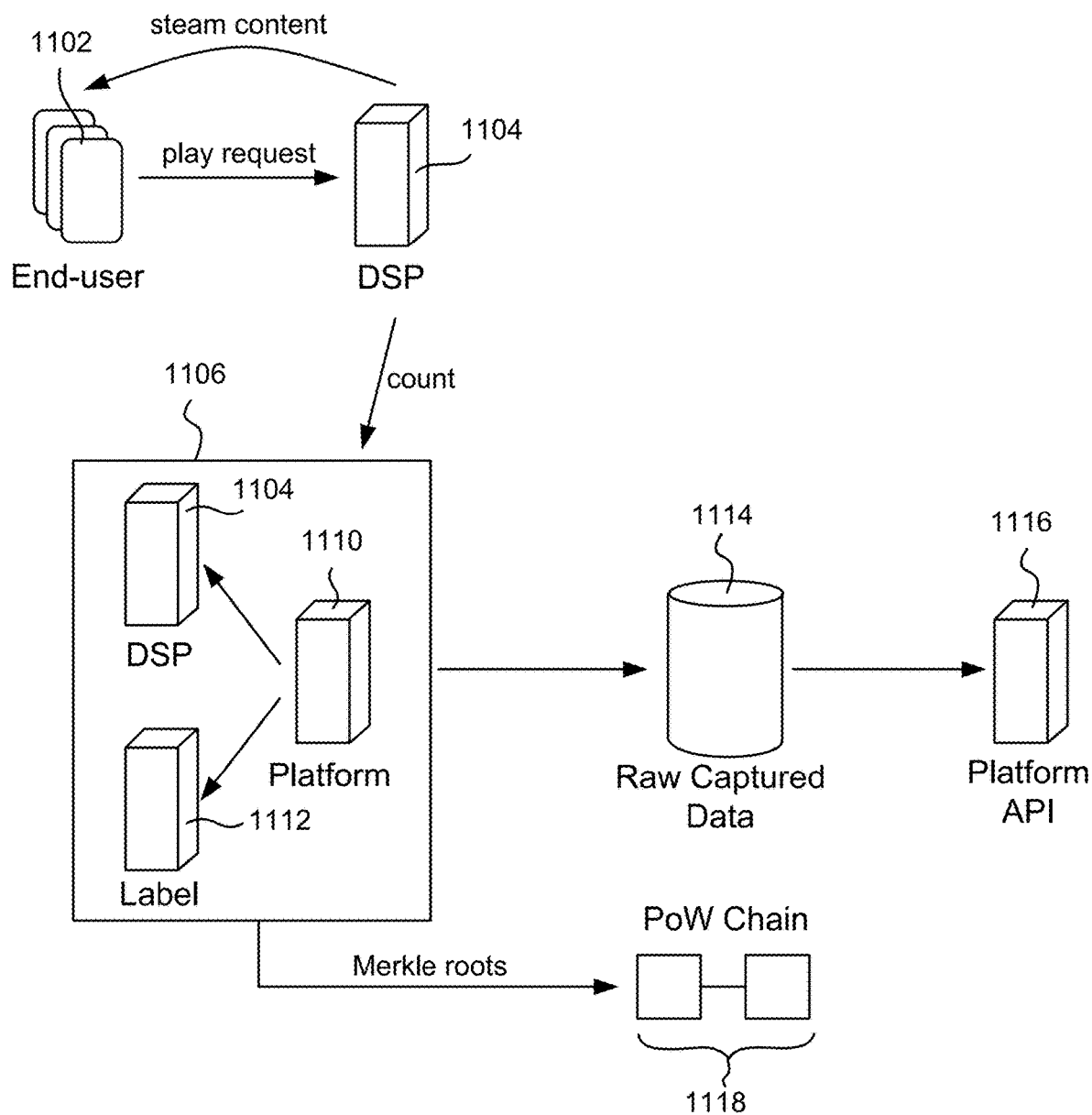
FIG. 11 illustrates an example non-CDN platform architecture for tracking media file playback, in accordance with embodiments of the present disclosure.

FIG. 11 illustrates an example non-CDN platform architecture for tracking media file playback, in accordance with embodiments of the present disclosure. End-user 1102 creates and sends a play request to DSP 1104. After verifying and validating the request, DSP 1104 then streams the content to end-user 1102. Counts of the play requests of songs are sent by DSP 1104 to the stream, which then sends the requests to a network of validation nodes 1106. The network of validation nodes 1106 includes platform 1110, which receives the request counts and in turn propagates the request counts to label 1112 and back to DSP 1104. In some embodiments, once a transaction request has been validated, it is stored separately in a database as raw captured data 1114. In some embodiments, the raw captured data is written to storage, e.g., a Structured Query Language (SQL) database, by the platform's archiver. In some embodiments, this raw captured data is then made available to authorized and relevant parties via querying a separate API 1116. In some embodiments, data on the blockchain stored at platform 1110 is merklized into seemingly random strings of characters called merkle roots. These merkle roots are then committed to a third-party/public external blockchain 1118, such as an external proof-of-work blockchain. This provides an additional point of security because the increase in hashing power of an external third-party blockchain increases the cost associated with tampering with the integrity of the blockchain.

Figure 12:
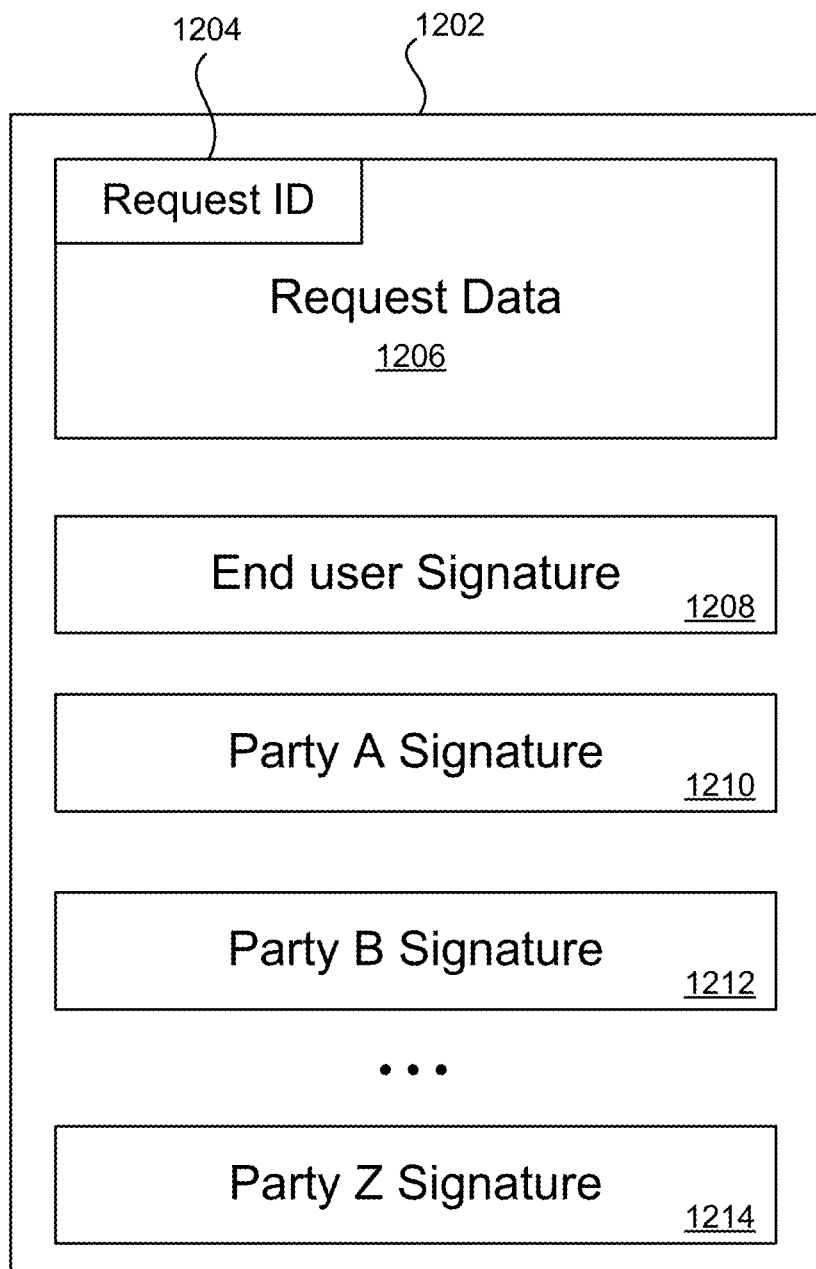
FIG. 12 illustrates an example of a transaction anatomy, in accordance with embodiments of the present disclosure.

FIG. 12 illustrates an example of a transaction anatomy, in accordance with embodiments of the present disclosure. Transaction 1202 is a data structure that includes request data 1206, end user signature 1208, and possibly one or more validation node signatures 1210, 1212, or 1214. In some embodiments, request data 1206 includes request ID 1204, which is a unique identifier for the transaction itself. For example, as sample request ID 1204 can be generated by concatenating the end user public key with the date and time of the transaction. In some embodiments, request data 1206 includes information regarding the request to play the song. For example, request data 1206 may contain information regarding the title of the song, the time the song was played, who requested the song, and/or the duration of the play of the song. In some embodiments, end user signature 1208 comprises a public-private key pair that uniquely identifies the end user. In some embodiments, the public and private key in the pair share a mathematical relationship. In some embodiments, the signatures for the validation nodes are also the same. Although FIG. 12 illustrates validation nodes as "Party A," Party B", and "Party Z," the parties can refer to any of the following: DSPs, platforms, labels, and distributors.

Figure 13:
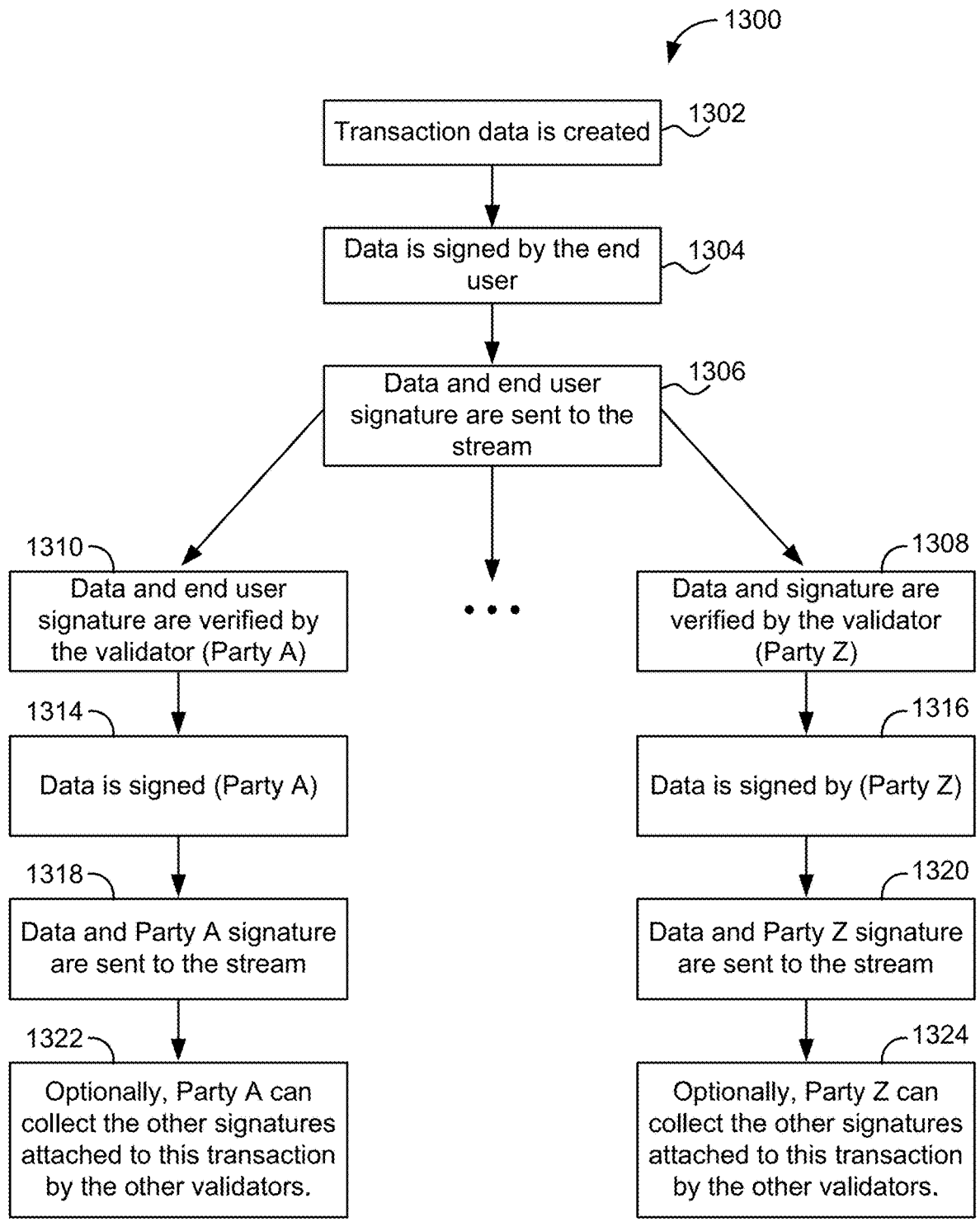
FIG. 13 illustrates an example of data flow of a transaction, in accordance with embodiments of the present disclosure.

FIG. 13 illustrates an example of data flow 1300 of a transaction, in accordance with embodiments of the present disclosure. Data flow 1300 begins with transaction data being created (1302) by an end user. The data is then signed (1304) by the end user. In some embodiments, the signature is a cryptographic signature that uniquely identifies the end user. Next, the data and the user signature are sent to the stream 1306. In some embodiments, the stream can be one single stream with access points from end users and validation nodes. In some embodiments, the stream is specific to each validation node. In some embodiments, the stream can be a hierarchy of different streams from different nodes. After the data and user signature hit the stream 1306, the data and user signature are sent to multiple validation nodes (Part A . . . Party Z). The nodes then verify (1310, 1308) the data and the end user signature. After verifying, the nodes then sign (1314, 1316) the data themselves. Next, the data and the nodes' signatures are then sent to the stream (1318, 1320). In some embodiments, the nodes can optionally collect (1322, 1324) the other signatures attached to the transaction by the other validators.

Figure 14:
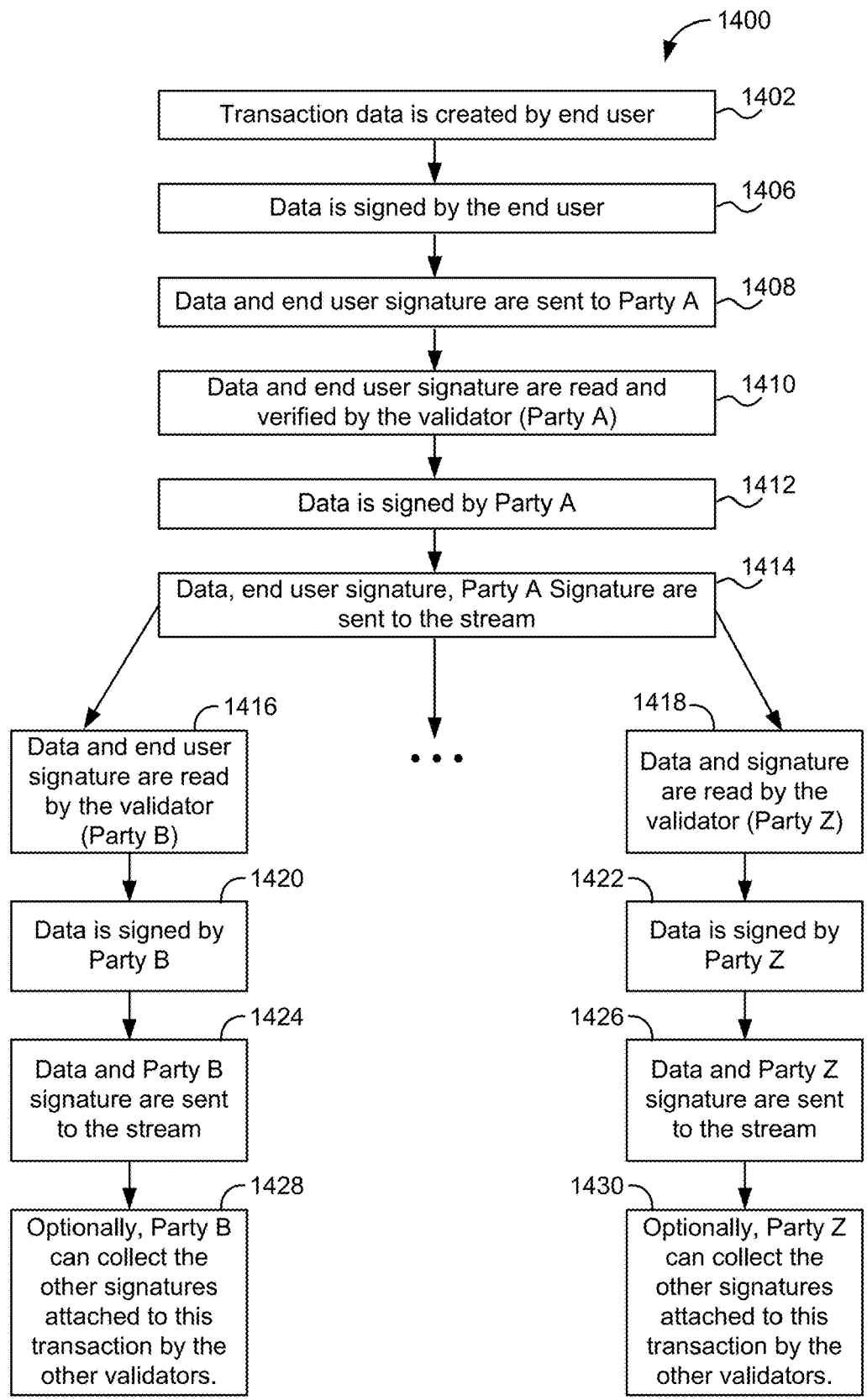
FIG. 14 illustrates another example of data flow of a transaction, in accordance with embodiments of the present disclosure.

FIG. 14 illustrates another example of data flow 1400 of a transaction, in accordance with embodiments of the present disclosure. Data flow 1400 begins with transaction data being created (1402) by an end user. The data is then signed (1406) by the end user. In some embodiments, the signature is a cryptographic signature that uniquely identifies the end user. Next, the data and the user signature are sent (1408) to a specific validation node, Party A. In some embodiments, Party A is a DSP. Party A then reads and verifies the data and end user signature (1410). After verifying the data and the end user signature, Party A then signs (1412) the data with its own cryptographic signature. Next, the data, the end user signature, and Party A's signature are sent to the stream (1414). In some embodiments, the stream can be one single stream with access points from end users and validation nodes. In some embodiments, the stream is specific to each validation node. In some embodiments, the stream can be a hierarchy of different streams from different nodes. After the data, user signature, and Party A's signature hit the stream 1414, the data, user signature, and Party A's signature are sent to multiple validation nodes (Part B . . . Party Z). The nodes then verify (1416, 1418) the data and the end user signature. After verifying, the nodes then sign (1420, 1422) the data themselves. Next, the data and the nodes' signatures are then sent to the stream (1424, 1426). In some embodiments, the nodes can optionally collect (1428, 1430) the other signatures attached to the transaction by the other validators.

Figure 15:
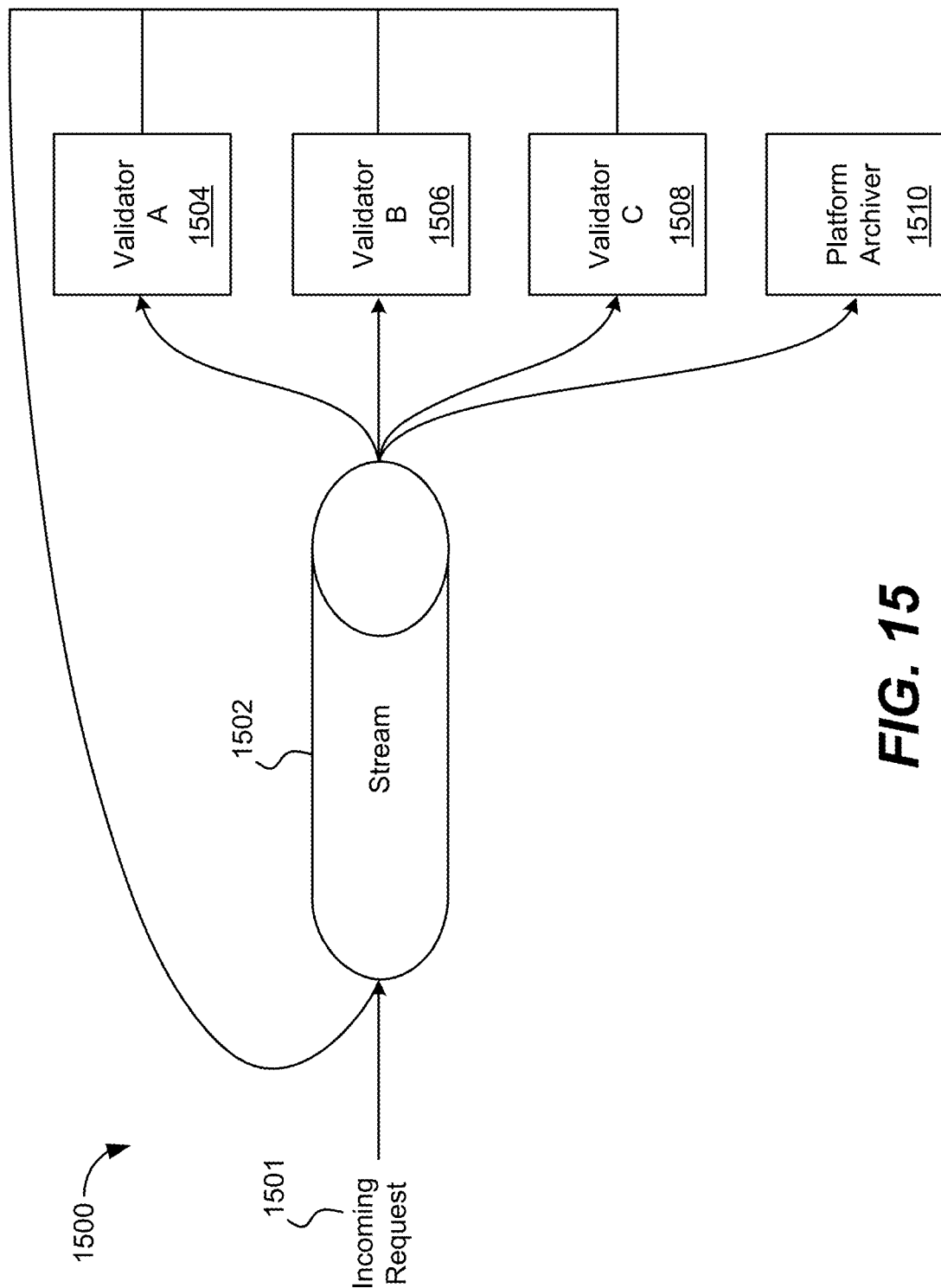
FIG. 15 illustrates a flow diagram of an example non-CDN platform architecture, in accordance with embodiments of the present disclosure.

FIG. 15 illustrates a flow diagram of an example non-CDN platform architecture 1500, in accordance with embodiments of the present disclosure. An incoming request 1501 is created by an end user, signed by an end user, and then sent to stream 1502. In some embodiments, request 1501 is a request to play a song. Stream 1502 then passes the request to validator A (1504), validator B (1506), and validator C (1508) to be validated according to the platform's protocol. Once each validator verifies and signs the request, it is then resent to the stream. In some embodiments, once two different validators have signed the request it is considered valid and then the request is sent to the platform archiver 1510 to be stored in a separate database.

Figure 16:
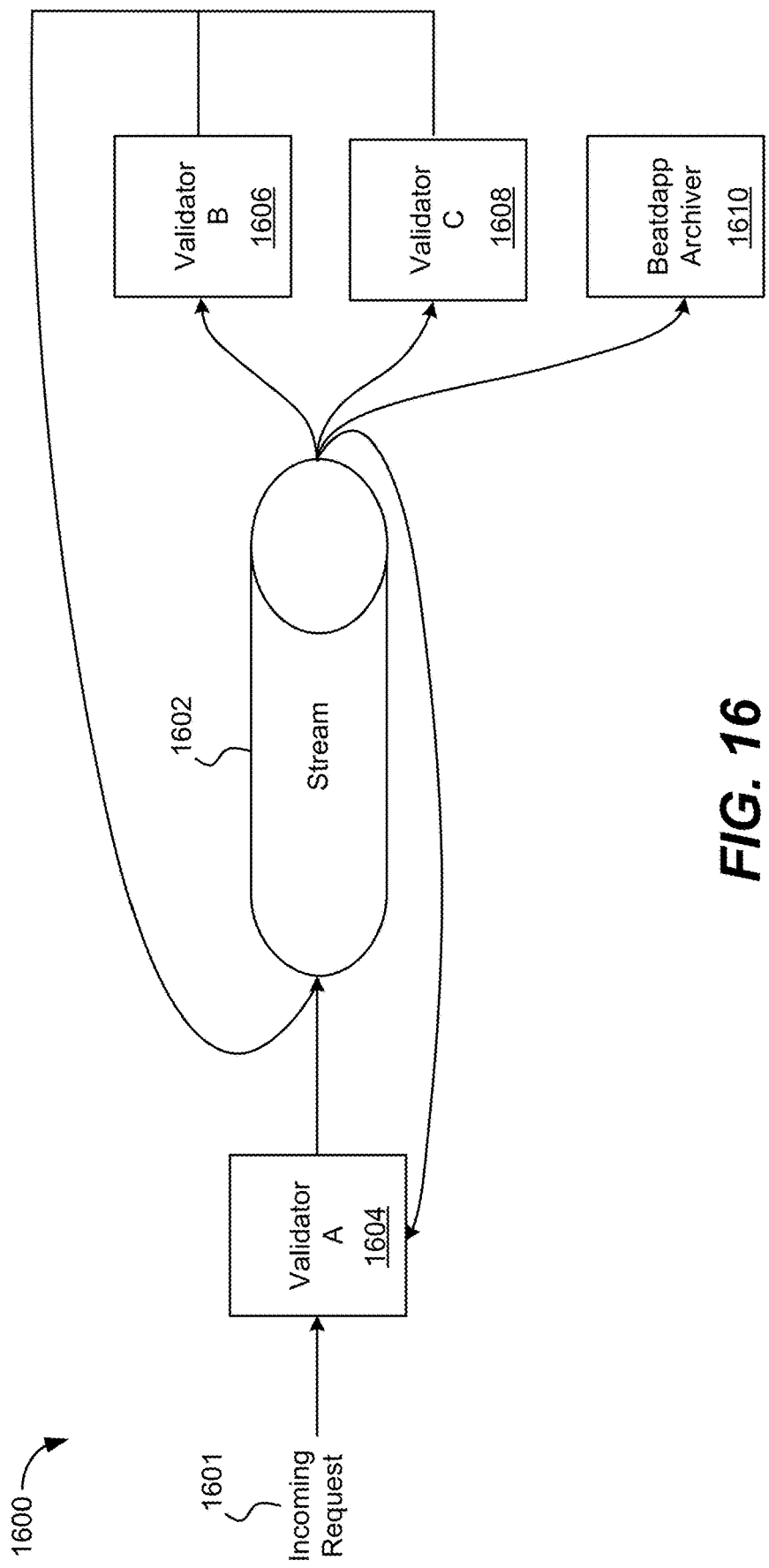
FIG. 16 illustrates another flow diagram of an example non-CDN platform architecture, in accordance with embodiments of the present disclosure.

FIG. 16 illustrates another flow diagram of an example non-CDN platform architecture 1600, in accordance with embodiments of the present disclosure. An incoming request 1601 is created by an end user, signed by an end user, and then sent to validator A (1604). In some embodiments, request 1601 is a request to play a song. After validator A verifies the request and signs the request, it then sends the request to stream 1602. Stream 1602 then passes the request to validator B (1606) and validator C (1608) to be validated according to the platform's protocol. Once each validator verifies and signs the request, it is then resent to the stream. In some embodiments, once two different validators have signed the request it is considered valid and then the request is sent to the platform archiver 1610 to be stored in a separate database.

Various embodiments described above refer to accurately keeping track of single play counts. This is important because, in some royalty agreements, payments that are made to rights holders are contingent on the number of times a certain file is served to a consumer. However, keeping track of single play counts may not be enough in certain situations. For example, in some royalty agreements, payment for a song depends upon the media file being played for at least a threshold duration of time. In simple embodiments, this can be solved with a simple binary measure: Did the number of seconds that the media file was streamed pass a given threshold? For example, in some embodiments a play is counted only after the content has been streamed or listened to for at least 30-seconds. This is the main method used for measuring music streaming usage in North America.

In some embodiments, it is even important to know which segments of a media file have been viewed and/or listened to. In such embodiments, advertisements are often embedded within the media content. For most over-the-top (OTT) media, cable TV, satellite TV, Internet TV, or video streaming platforms, payment to rights holders are accrued based on the number of times an end user views an advertisement or content play. Each advertisement view might have its own threshold for how much of the ad must be viewed in order for it to be considered an ad view. Thus, it may be important for certain embodiments to be able to continuously track streaming or media file playback in order to ensure certain play duration thresholds are met or to ensure that certain media segments are played before a play is counted.

According to various embodiments, in order to count a discrete play, the counting function needs to run one time. In some embodiments, when tracking continuous streaming, there are multiple options available some of which can be combined.

In some embodiments, parts of the media file that were played are saved on the user device locally. In this way, the counting function is not run until the song is done playing. One advantage of this method is a decrease in the frequency of counting function calls. However, this method does not allow the counting data to be performed in real time.

Figure 17A:
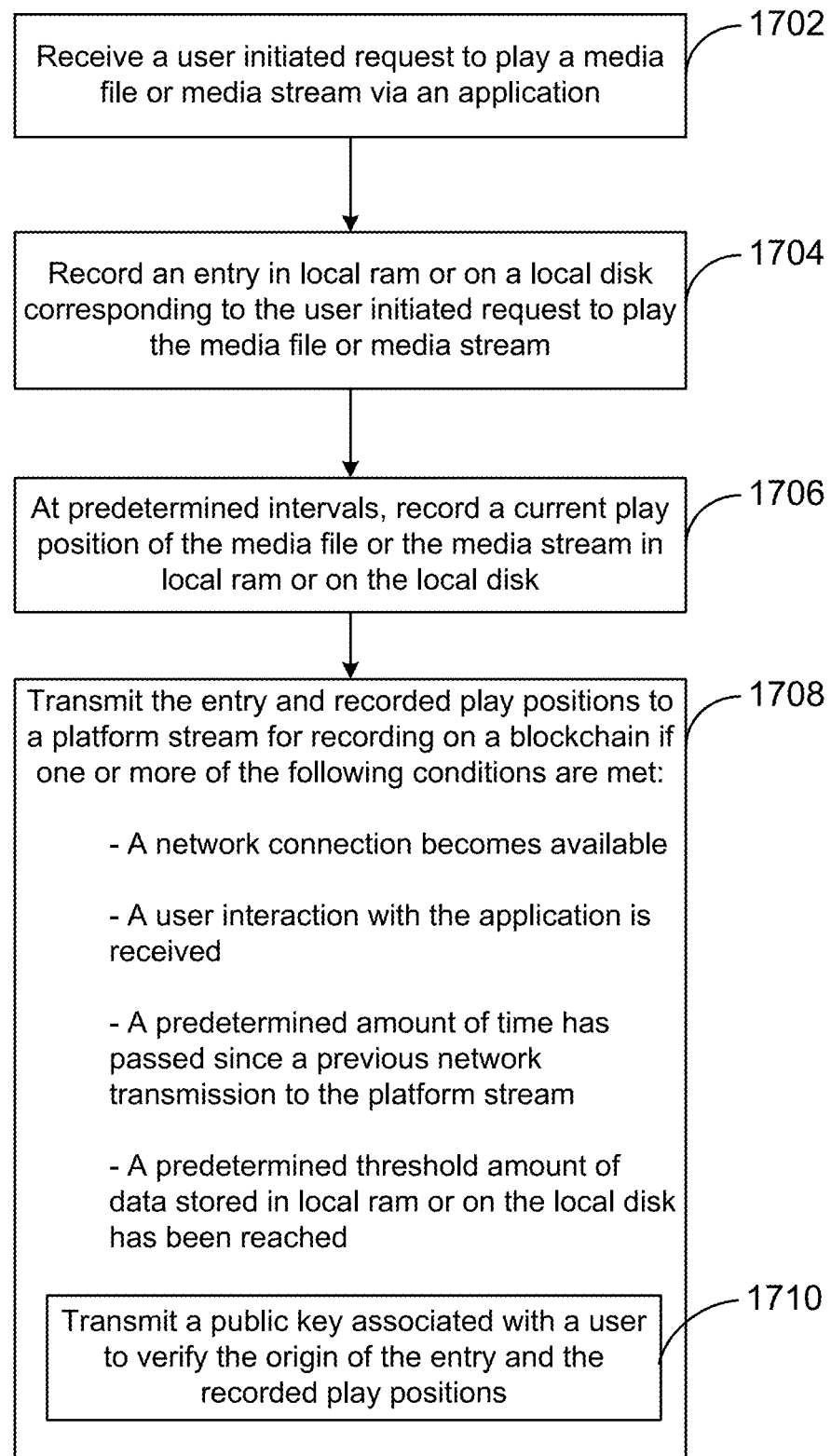
FIGS. 17A-17B show a flowchart of a method for continuous tracking of media file playback using local persistence, in accordance with embodiments of the present disclosure.
Figure 17B:
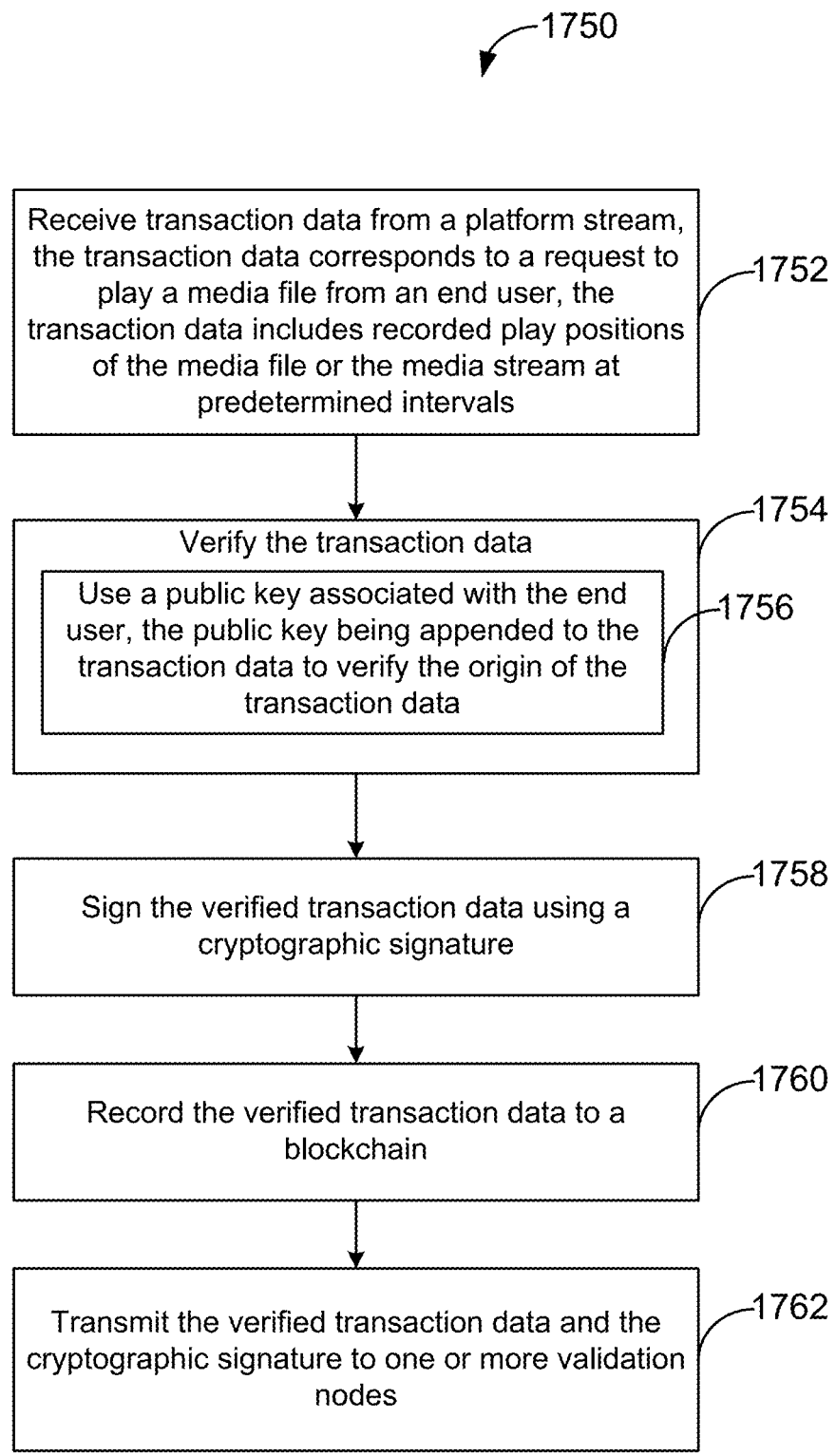

FIGS. 17A-17B show a flowchart of a methods 1700 and 1750 for continuous tracking of media file playback using local persistence, in accordance with embodiments of the present disclosure.

At 1702, a user initiated request to play a media file or media stream via an application is received at a user device. In some embodiments, this can occur when a user opens a streaming application and starts playing a media file, e.g., Media File A, on the user device.

At 1704, an entry is recorded in local ram or on a local disk corresponding to the user initiated request to play the media file or media stream. In some embodiments, an entry is made when the user initiates the media file to play. In some embodiments, the entry can include the media file's name, the name of the rights holder of the media file, and/or any other type of metadata that could help identify the media file. In addition, in some embodiments, the user who initiated the play will use their private key to sign the details of the play initiation and store that signature locally along with the other details of the transaction.

At 1706, a current play position of the media file or the media stream is recorded in local ram or on the local disk at predetermined intervals. For example, at every X second(s), the current position of the user's stream is recorded either in ram or on disk. In some embodiments, at these intervals, the user's private key will be used to sign the data that is being saved locally. In some embodiments, if the user skips to a next media file, e.g., Media File B, another entry is made on the device indicating that Media File B has initiated playing. In some embodiments, the same details are recorded as when Media File A was initiated and streamed.

At 1708, the entry and recorded play positions are transmitted to a platform stream for recording on a blockchain. This is because in order to persist the data that is currently saved locally to network storage or a blockchain, the data must be communicated to the platform stream. In some embodiments, the data is only transmitted to the platform stream if one or more of the following conditions are met: 1) a network connection becomes available, 2) a user interaction with the application is received, 3) a predetermined amount of time has passed since a previous network transmission to the platform stream, and 4) a predetermined threshold amount of data stored in local ram or on the local disk has been reached. In some embodiments, a user interaction with the application includes choosing a new media file to play, stopping the media file, pausing the media file, seeking to a new position, fast forwarding or rewinding, or pressing replay.

In some embodiments, when the data is sent over to the platform stream, the user's public key is appended (1710) to the data set so it can be used to verify the origin of the requests by other entities. In some embodiments, this public key verifies the origin by verifying the private key used to generate the user's signature. In some embodiments, this is important to prevent fraudulent play counts.

In some embodiments, each request is signed with the private key when the data is persisted locally. In other embodiments, data is only signed right before it is sent to the platform stream, thereby reducing the frequency of signing. In such embodiments, the data can be consolidated before being signed by the user's private key. The signature is then only appended once to the request before being sent to the platform stream.

FIG. 17B illustrates a method 1750, which describes an example of what happens after the data is transmitted over the platform stream to a platform server. In some embodiments, method 1750 is similar to method 1000 described above. In some embodiments, method 1750 can be combined with method 1700 as an integrated method performed at an end user device and a platform server.

At 1752, transaction data from a platform stream is received. In some embodiments, the transaction data corresponds to a request to play a media file from an end user. In some embodiments, the transaction data includes recorded play positions of the media file or the media stream at predetermined intervals, similar to the entry and recorded play positions transmitted to the platform stream in method 1700.

At 1754, the transaction data is verified. In some embodiments, verifying the transaction includes using (1756) a public key associated with the end user and is appended to the transaction data to verify the origin of the transaction data. In some embodiments, verifying the transaction data includes all the steps used to verify the transaction data in step 1004 of method 1000.

At 1758, the verified transaction data is signed yielding a cryptographic signature associated with the platform server. At 1760, the verified transaction data is recorded to a blockchain. In some embodiments, the transaction data is only recorded if it is determined that the transaction data is a valid blockchain transaction, as in steps 1006 and 1008 of method 1000. At 1762, the transaction data and the cryptographic signature are transmitted to one or more validation nodes, like step 1010 of method 1000.

FIGS. 17A-17B describe a method for continuous tracking using local persistence. In some embodiments, a second way to continuously track which segments of a file have been consumed is to measure what has been buffered from the server to the end user. This method is especially useful in systems where the media file is delivered directly from the CDN. In such cases, the server that is sending the content to the user is the device that is able to measure which segments are actually being streamed by the user. The disadvantage of this method is that some buffered content may not actually be played by the end user.

Figure 18A:
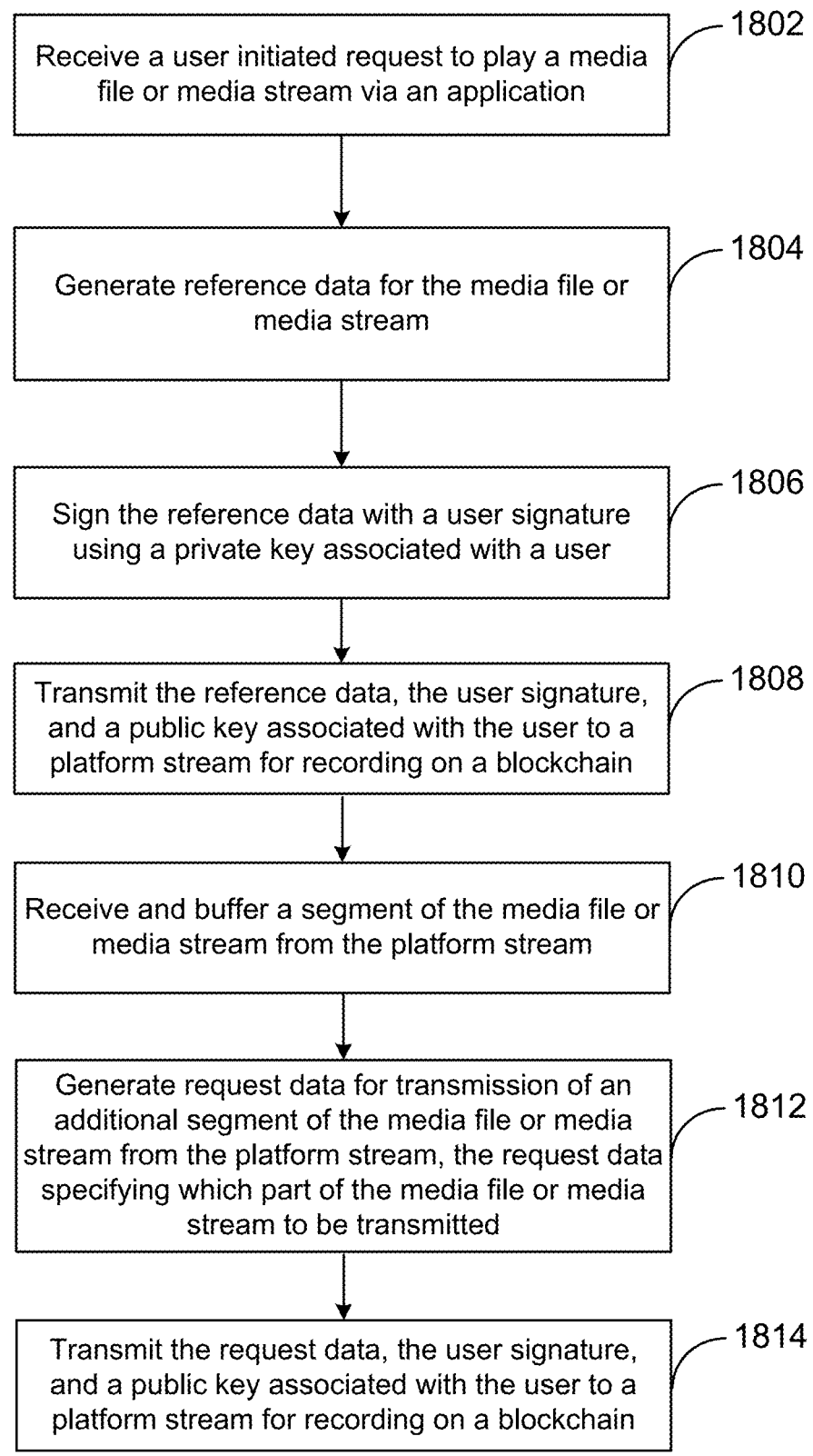
FIGS. 18A-18B show a flowchart of a method for continuous tracking using buffer approximations, in accordance with embodiments of the present disclosure.
Figure 18B:
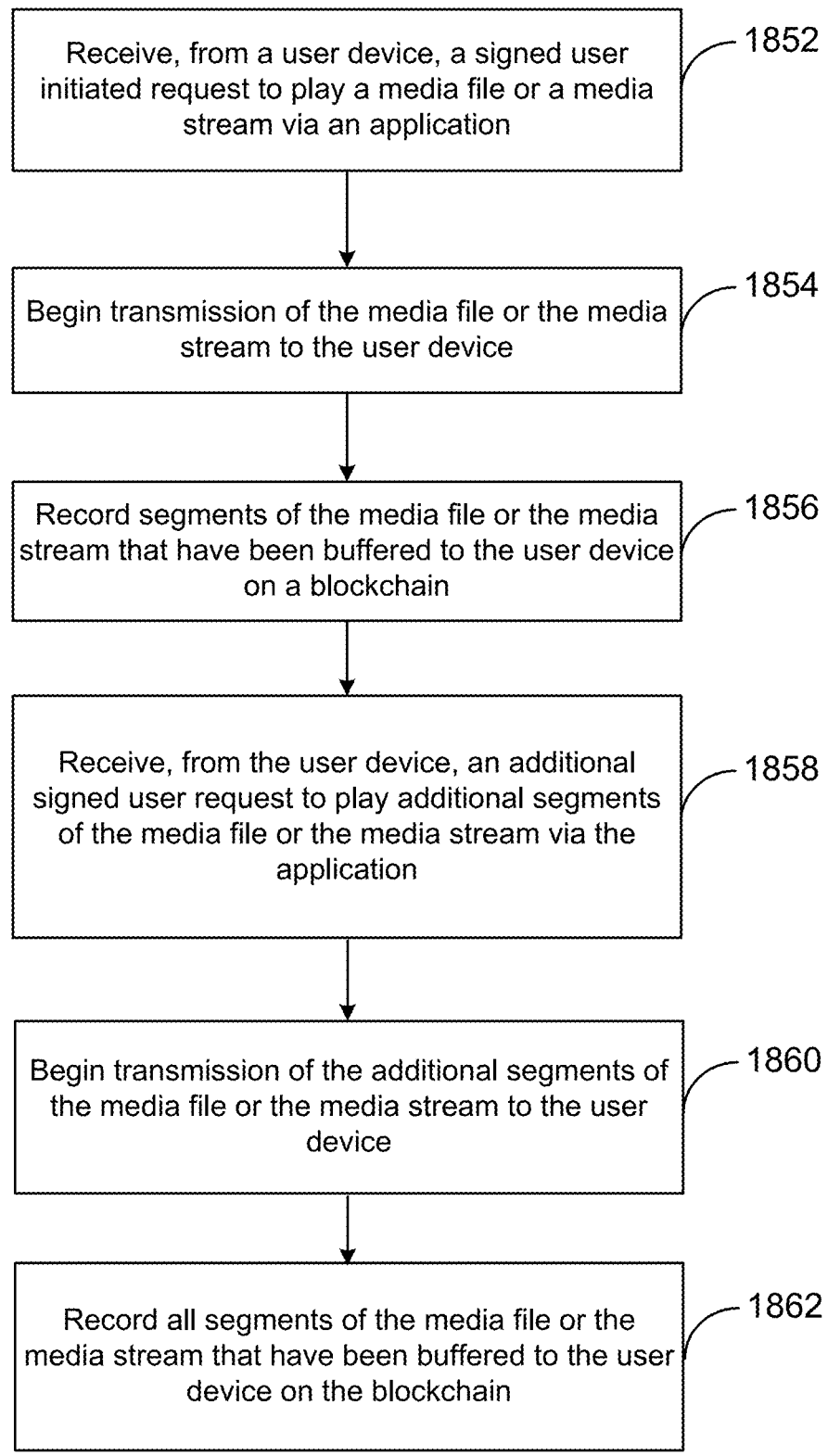

FIGS. 18A-18B describe a method for continuous tracking using buffer approximations.

Method 1800 occurs at the user device and method 1850 occurs at the platform or content delivery server. At 1802, a user initiated request to play a media file or media stream via an application is received at an end user device. In some embodiments, this occurs when a user opens the streaming application on the user device and wants to start streaming a file, e.g., Media File A. At 1804, reference data for the media file or media stream is generated. At 1806, the user's private key is used to sign the reference data with a user signature. In some embodiments, this user signature could be a unique identifier for the media file. At 1808, the reference data, the user signature, and a public key associated with the user are transmitted to a platform stream for recording on a blockchain.

Switching now to the server side, method 1850 describes a platform or content delivery server's role in continuous tracking using buffer approximations. At 1852, a signed user initiated request to stream media or play a media file or a media stream via an application is received from a user device. In some embodiments, this signed user initiated request includes the reference data, the user signature, and the public key associated with the user, which were transmitted at step 1808. At 1854, the media file or the media stream starts transmitting to the user device. At 1856, the server records which segments of the media file or media stream have been buffered to the user device on a blockchain. In some embodiments, recording the segments includes verifying the transaction data and determining whether the transaction constitutes a valid blockchain transaction, as described above.

Switching back to the user device, at 1810, the user receives and buffers a segment of the media file or media stream from the platform stream. In some embodiments, if the user does not specifically request more segments, but also does not issue another user interaction event to the server, then the user device will just continue to receive and buffer segments of the media file or the media stream until the media file or media stream finishes streaming. All the while, in such embodiments, if the server does not receive a user interaction event, the server will continue to transmit segments to the user device and record segments of content that have been buffered to the blockchain. As used herein, "content" and "media file" or "media stream" will be used interchangeably. In some embodiments, the order of transmitting and recording does not matter as long as all transmitted content is recorded. In some embodiments, transmitting the content from the server also includes a sending buffer. In such embodiments, recording the segments buffered on the server side rather than segments actually transmitted is also an option.

In some embodiments, once the user device finishes buffering the segments, the user device automatically requests additional segments of the content to be transmitted for buffering. In some embodiments, the user must actively/manually request additional segments. In some embodiments, whenever the user requests for more content to be buffered, either manually or automatically, the user's device must specify which part of the content needs to be streamed. Thus, at 1812, request data for transmission of an additional segment of the media file or media stream from the platform stream is generated. In some embodiments, the request data specifies exactly which part of the media file or media stream is to be transmitted. In some embodiments, the user's private key is again used to sign the request for additional segments. At 1814, the request data, the user signature, and the user's public key are communicated to the server for transmission of the additional segments and for recording to the blockchain.

Finally, switching back to the server side, at 1858, the server receives an additional request to play additional segments. In some embodiments, the additional request includes the request data, the user signature, and the user's public key transmitted in step 1814. As in steps 1854 and 1856, the server transmits (1860) the additional segments requested and records (1862) all segments that have been buffered to the user device on the blockchain.

FIGS. 17A-18B describe two methods for continuous tracking. In some embodiments, yet another way to continuously track segments played by the end user is to constantly poll or sample which part of the media file is currently playing on the user device. In this method, either the user device or the platform server, or even a third party device, can sample the stream periodically for recording to the blockchain. If the user device or a third party device samples the stream, then either device can transmit each sample on the fly or each device can alternatively persist the samples locally to be transmitted to the platform server at a later time. If the platform server does the sampling, then the samples can be directly recorded onto the blockchain, provided the samples are valid blockchain transactions. One disadvantage with sampling is that the stream must be continuously polled or sampled. Consequently, the measurement accuracy increases with higher frequency of polling.

Figure 19:
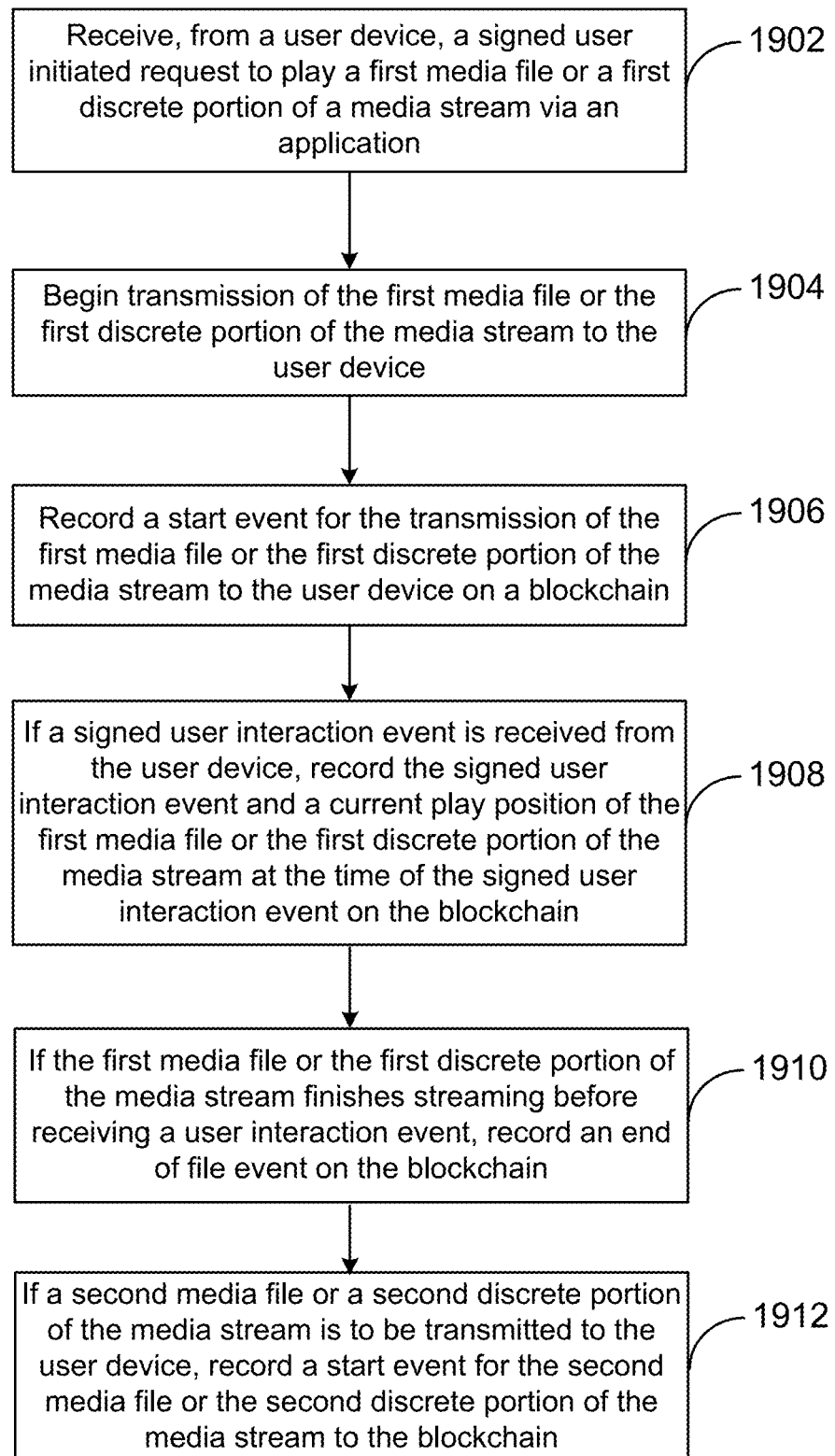
FIG. 19 shows a flowchart of a method for continuous tracking using user interactions, in accordance with embodiments of the present disclosure.

In some embodiments, yet another method for continuous tracking relies on recording all user interactions. In such embodiments, if the state of the media consumption is a known condition, then all of a user's interactions can be recorded (either remotely or locally) as an approximate measure of which parts of the media file were viewed. For example, FIG. 19 describes a method 1900 for continuous tracking using recorded user interactions.

At 1902, a signed user initiated request to play a first media file or a first discrete portion of a media stream via an application is received from a user device. For example, in some embodiments, a user opens the streaming application and wants to start streaming a media file, e.g., Media File A, so the user hits play on their application. In some embodiments, the user's private key is used to sign the initiation of the "play".

At 1904, the first media file or the first discrete portion of the media stream begins transmitting to the user device. At 1906, a start event for the transmission of the first media file or the first discrete portion of the media stream to the user device is recorded on a blockchain.

At 1908, if a signed user interaction event is received from the user device, the signed user interaction event and a current play position of the first media file or the first discrete portion of the media stream at the time of the signed user interaction event is recorded on the blockchain. For example, after a few seconds of streaming the file, the user seeks to halfway through Media File A. The position that the user was at the instant before the seeking event is recorded with the seek event. In some embodiments, as the seek event is recorded, the user's private key is used to sign the interaction.

In some embodiments, an end of file event is recorded on the blockchain (1910) if the first media file or the first discrete portion of the media stream finishes streaming before receiving a user interaction event. In other words, the user lets the stream finish without interacting with the streaming application any further. In some embodiments, if the user has autoplay on, Media File B begins streaming after Media File A finishes. In such embodiments, a "play" event is initiated just as if the user hit play, as the user did with Media File A. A major difference between the play event associated with Media File B and the play event associated with Media File A (other than the content and metadata of the files being different) is that the user's streamed position of the previous file is included in the play event for Media File B, but not in Media File A. In this case, the stream position recorded for Media File A, will be equal to the duration of Media File A.

At 1912, if a second media file or a second discrete portion of the media stream is to be transmitted to the user device, record a start event for the second media file or the second discrete portion of the media stream to the blockchain. In other words, if the user stops streaming content through the streaming application. A "stop" event is created. The position that the user was at, on Media File B the instant before the stop event was initiated, is then recorded and appended to the stop event. In some embodiments, the user's private key is used to sign the interaction.

In some embodiments, the data associated with these interaction events, which include the signature for each event and the user's public key, can be stored locally on the device and uploaded intermittently or they can be sent to the platform stream as they occur.

Figure 20:
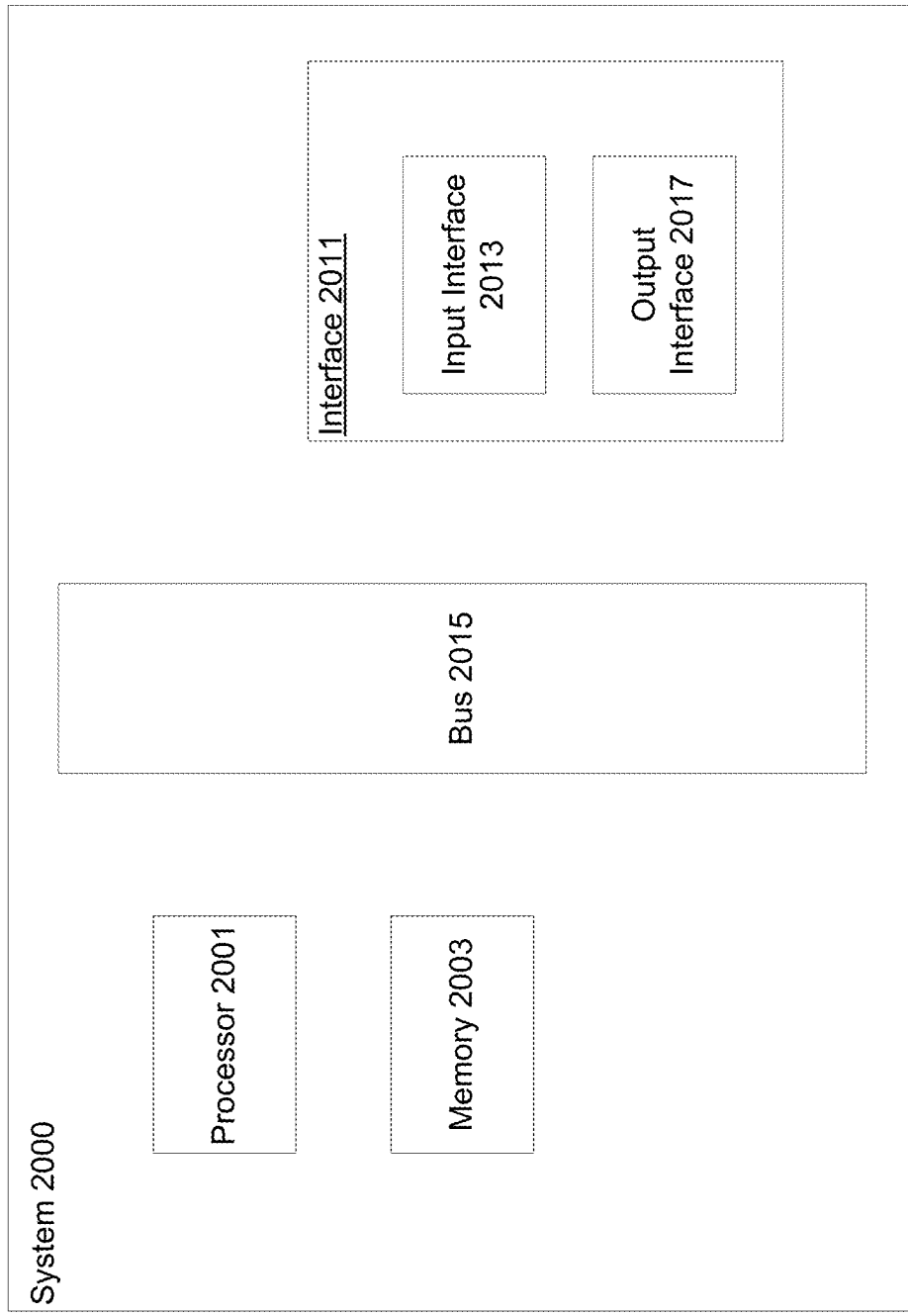
FIG. 20 shows one example of a computer system, in accordance with embodiments of the present disclosure.

Various computing devices can implement the methods described. For instance, a mobile device, computer system, etc. can be used for accessing aspects of the network environment by either the client, music label, or DSP. With reference to FIG. 20, shown is a particular example of a computer system that can be used to implement particular examples of the present disclosure. For instance, the computer system 2000 can be used to provide generate artificially rendered images according to various embodiments described above. In addition, the computer system 2000 shown can represent a computing system on a mobile device. According to particular example embodiments, a system 2000 suitable for implementing particular embodiments of the present disclosure includes a processor 2001, a memory 2003, an interface 2011, and a bus 2015 (e.g., a PCI bus). The interface 2011 may include separate input interface 2013 and output interface 2017, or may be a unified interface supporting both operations. When acting under the control of appropriate software or firmware, the processor 2001 is responsible for such tasks such as optimization. Various specially configured devices can also be used in place of a processor 2001 or in addition to processor 2001. The complete implementation can also be done in custom hardware. The interface 2011 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2000 uses memory 2003 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 21:
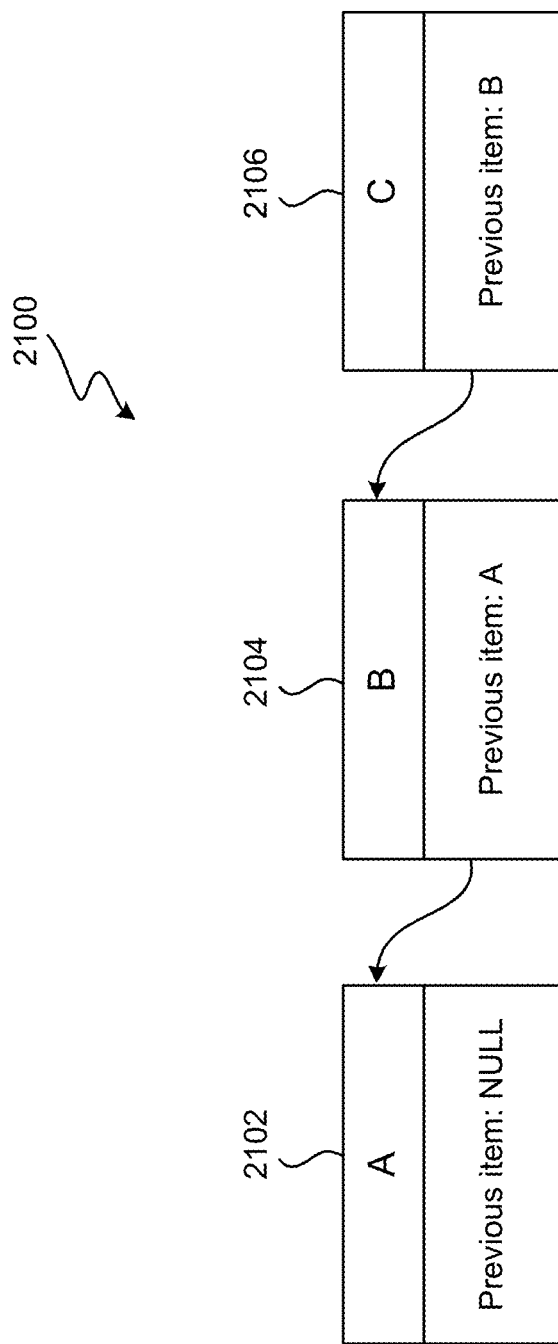
FIG. 21 shows one example of a linked list data structure, in accordance with embodiments of the present disclosure.

FIG. 21 shows a linked list data structure 2100 represented with three data segments 2102, 2104, and 2106. Conventional blockchains are structured similar to linked lists such that each segment of data refers to a previously created segment of data. For example, data segment 2106 contains a set of arbitrary data. In order for data segment 2106 to become a part of the entire data set, it contains a reference to the data segment that preceded it. In this case data segment 2104 comes before data segment 2106, therefore data segment 2106 contains a reference to data segment 2104. In some embodiments, the first entry into a linked list, FIG. 21 the data segment 2102, does not have a reference to any other data segments.

Figure 22:
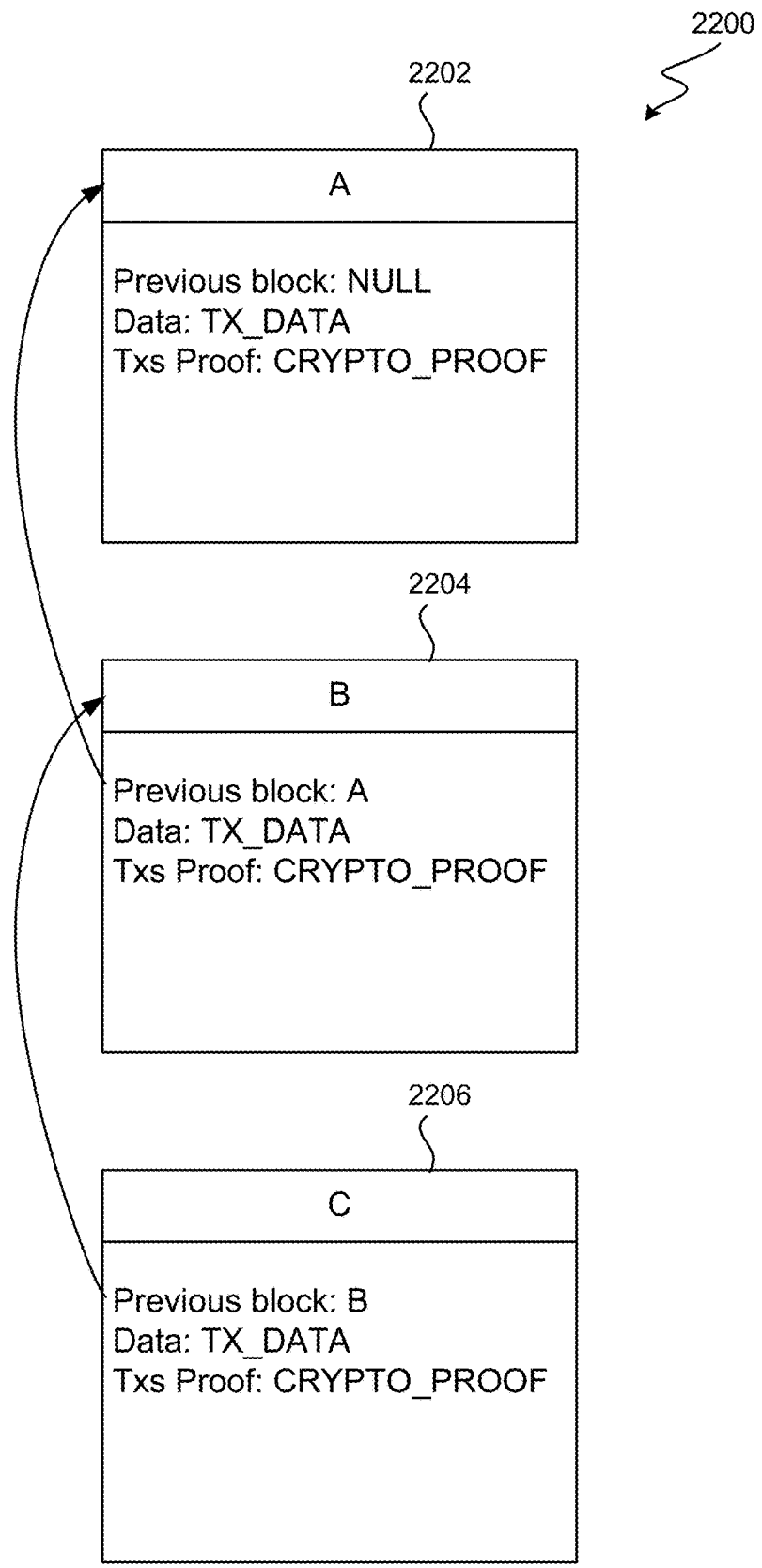
FIG. 22 shows a conceptual example of a blockchain, in accordance with embodiments of the present disclosure.

FIG. 22 shows a conceptual example of a blockchain 2200. Each block (2202, 2204, and 2206) contains a set of data within it. This data can be arbitrarily set, however, it is traditionally a list of transactions. In a similar spirit to the linked list in FIG. 21, each block has a reference to the block that preceded it. One distinguishing trait of blockchains as a data structure is that they contain cryptographic proofs that the data that they hold in each block has not been tampered with.

To ensure that historic data on the platform's network as a whole has not been tampered with, periodically segments of the data are aggregated and merklized into seemingly random strings of characters called "merkle roots." FIG. 23 illustrates an example of this merklization process 2300. In FIG. 23, segments of data 2304 on platform blockchain 2308 are aggregated and merklized into merkle roots 2306. These merkle roots of the set of data are then written to a third-party blockchain 2302 that could be backed by any consensus algorithm such as Proof of Work or Proof of Stake. This serves as a supplemental point of security or audit point. The motivation behind creating audit points that lie outside of the platform's blockchain 2308 is so any attacks performed on the platform's blockchain would be more expensive to undertake since the third party network 2302 would need to be attacked as well. For example, FIG. 23 shows an example of merklizing of a portion of the platform's data set 2304. Given a set of data that is claimed to be from a specific segment of the platform's blockchain, the veracity can be concluded by merklizing the set of data and ensuring it produces the same merkle root that exists on the third party blockchain 2302.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A system for continuous tracking of media file or media stream playback via a blockchain based platform, the system comprising:
   a processor; and
   memory, the memory storing instructions to cause a processor to execute a method, the method comprising:
      receiving a user initiated request to play a media file or media stream via an application;
      transmitting segments of the media file or media stream to a user device;
      recording streaming data corresponding to which segments of the media file or media stream have been transmitted to the user device, the streaming data including current play positions of the media file or the media stream in multiple intervals;
      transmitting the request and recorded streaming data for recording on a blockchain; and
      determining that the request qualifies as a play count only if the streaming data recorded on the blockchain includes a plurality of current play positions that demonstrates that the media file has been streaming for a predetermined threshold duration of time.

2. The system of claim 1, wherein the request includes one or more of the following: a media file or media stream name, a rights holder name, and metadata associated with the media file or the media stream.

3. The system of claim 1, wherein any request to play more content must specify which part of the content needs to be streamed.

4. The system of claim 1, wherein any requests to play more content is signed by a user's private key.

5. The system of claim 1, wherein the request includes reference data to the media file or media stream, the reference data being signed by a user's private key.

6. The system of claim 5, wherein the reference data is a unique identifier of the media file or media stream.

7. The system of claim 1, wherein the request is transmitted to the platform stream along with signatures and a user public key.

8. A method for continuous tracking of media file or media stream playback via a blockchain platform, the method comprising:
   receiving a user initiated request to play a media file or media stream via an application;
   transmitting segments of the media file or media stream to a user device;
   recording streaming data corresponding to which segments of the media file or media stream have been transmitted to the user device, the streaming data including current play positions of the media file or the media stream in multiple intervals;
   transmitting the request and recorded streaming data for recording on a blockchain; and
   determining that the request qualifies as a play count only if the streaming data recorded on the blockchain includes a plurality of current play positions that demonstrates that the media file has been streaming for a predetermined threshold duration of time.

9. The method of claim 8, wherein the request includes one or more of the following: a media file or media stream name, a rights holder name, and metadata associated with the media file or the media stream.

10. The method of claim 8, wherein any request to play more content must specify which part of the content needs to be streamed.

11. The method of claim 8, wherein any requests to play more content is signed by a user's private key.

12. The method of claim 8, wherein the request includes reference data to the media file or media stream, the reference data being signed by a user's private key.

13. The method of claim 12, wherein the reference data is a unique identifier of the media file or media stream.

14. The method of claim 8, wherein the request is transmitted to the platform stream along with signatures and a user public key.

15. A non-transitory computer readable medium storing instructions to execute a method, the method comprising:
 receiving a user initiated request to play a media file or media stream via an application;
 transmitting segments of the media file or media stream to a user device;
 recording streaming data corresponding to which segments of the media file or media stream have been transmitted to the user device, the streaming data including current play positions of the media file or the media stream in multiple intervals;
 transmitting the request and recorded streaming data for recording on a blockchain; and
 determining that the request qualifies as a play count only if the streaming data recorded on the blockchain includes a plurality of current play positions that demonstrates that the media file has been streaming for a predetermined threshold duration of time.

16. The non-transitory computer readable medium of claim 15, wherein the request includes one or more of the following: a media file or media stream name, a rights holder name, and metadata associated with the media file or the media stream.

17. The non-transitory computer readable medium of claim 15, wherein any request to play more content must specify which part of the content needs to be streamed.

18. The non-transitory computer readable medium of claim 15, wherein any requests to play more content is signed by a user's private key.

19. The non-transitory computer readable medium of claim 15, wherein the request includes reference data to the media file or media stream signed, the reference data being by a user's private key.

20. The non-transitory computer readable medium of claim 19, wherein the reference data is a unique identifier of the media file or media stream.

* * * * *